(12) United States Patent
Kishi

(10) Patent No.: US 8,509,548 B2
(45) Date of Patent: Aug. 13, 2013

(54) IMAGE DECODING APPARATUS AND CONTROL METHOD FOR SPEEDING UP DECODING PROCESSING

(75) Inventor: Hiroki Kishi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/785,539

(22) Filed: May 24, 2010

(65) Prior Publication Data

US 2010/0316303 A1    Dec. 16, 2010

(30) Foreign Application Priority Data

Jun. 16, 2009    (JP) ................................ 2009-143668

(51) Int. Cl.
  *G06K 9/36*    (2006.01)
(52) U.S. Cl.
  USPC .......................................... 382/233; 382/239
(58) Field of Classification Search
  None
  See application file for complete search history.

(56) References Cited

U.S. PATENT DOCUMENTS

| | | | | |
|---|---|---|---|---|
| 5,227,789 | A * | 7/1993 | Barry et al. ..................... | 341/65 |
| 5,802,213 | A * | 9/1998 | Gardos .......................... | 382/239 |
| 6,175,596 | B1 * | 1/2001 | Kobayashi et al. ....... | 375/240.27 |
| 6,185,340 | B1 | 2/2001 | Comer .......................... | 382/236 |
| 6,427,027 | B1 * | 7/2002 | Suzuki et al. ................. | 382/236 |
| 6,549,676 | B1 | 4/2003 | Nakayama et al. .......... | 382/246 |
| 6,560,365 | B1 | 5/2003 | Nakayama et al. .......... | 382/233 |
| 6,567,562 | B1 | 5/2003 | Nakayama et al. .......... | 382/246 |
| 6,600,835 | B1 | 7/2003 | Ishikawa ....................... | 382/236 |
| 6,711,295 | B2 | 3/2004 | Nakayama et al. .......... | 382/232 |
| 6,768,819 | B2 | 7/2004 | Yamazaki et al. ........... | 382/240 |
| 6,847,735 | B2 | 1/2005 | Kajiwara et al. ............. | 382/233 |
| 6,879,726 | B2 | 4/2005 | Sato et al. ..................... | 382/239 |
| 6,879,727 | B2 | 4/2005 | Sato et al. ..................... | 382/239 |
| 6,917,716 | B2 | 7/2005 | Kajiwara et al. ............. | 382/240 |
| 6,947,600 | B1 | 9/2005 | Sato et al. ..................... | 382/233 |
| 6,950,471 | B2 | 9/2005 | Kishi ....................... | 375/240.19 |
| 6,993,198 | B2 | 1/2006 | Kishi ............................. | 382/240 |
| 7,258,669 | B2 | 8/2007 | Russell ......................... | 600/458 |
| 7,305,139 | B2 * | 12/2007 | Srinivasan et al. ............ | 382/248 |
| 7,428,342 | B2 * | 9/2008 | Tu et al. ........................ | 382/248 |
| 7,454,075 | B2 | 11/2008 | Fukuhara et al. ............. | 382/240 |

(Continued)

FOREIGN PATENT DOCUMENTS

JP    2006-197573 A    7/2006

OTHER PUBLICATIONS

Office Action dated Jul. 26, 2011, in U.S. Appl. No. 12/412,002.
Office Action dated Jul. 15, 2011, in U.S. Appl. No. 12/411,992.

(Continued)

*Primary Examiner* — Wenpeng Chen
(74) *Attorney, Agent, or Firm* — Fitzpatrick, Cella, Harper & Scinto

(57) ABSTRACT

This invention provides a technique of speeding up decoding processing by omitting several processes while reducing the influence of omission of processes on image quality in accordance with the variable magnification ratios at which images are to be decoded and displayed. For this purpose, an apparatus according to the invention analyzes the header of decoding target encoded image data. The apparatus then obtains information indicating how many times distortion suppression processing has been executed at the time of the generation of the encoded image data. The apparatus decides which process can be omitted, based on the set variable magnification ratio and the information extracted from the header, and generates an image on which an output is based, by executing the processes which are not to be omitted. The apparatus then re-sizes the image in accordance with the set magnification ratio.

9 Claims, 25 Drawing Sheets

(56) References Cited

U.S. PATENT DOCUMENTS

| | | | |
|---|---|---|---|
| 7,483,581 B2 | 1/2009 | Raveendran et al. | 382/236 |
| 7,499,592 B2 | 3/2009 | Nakayama et al. | 382/233 |
| 7,551,789 B2 * | 6/2009 | Tu et al. | 382/248 |
| 7,574,063 B2 | 8/2009 | Kajiwara et al. | 382/239 |
| 7,630,576 B2 * | 12/2009 | Kondo | 382/276 |
| 7,663,779 B2 | 2/2010 | Nagao et al. | 358/1.2 |
| 7,715,637 B2 | 5/2010 | Kishi | 382/232 |
| 7,715,648 B2 * | 5/2010 | Bae et al. | 382/268 |
| 7,751,478 B2 * | 7/2010 | Kim et al. | 375/240.12 |
| 7,925,097 B2 | 4/2011 | Tarumoto et al. | 382/232 |
| 7,991,237 B2 * | 8/2011 | Sekiguchi et al. | 382/238 |
| 8,094,726 B2 | 1/2012 | Kishi et al. | 375/240.24 |
| 8,184,711 B2 * | 5/2012 | Horiuchi et al. | 375/240.18 |
| 8,204,342 B2 * | 6/2012 | Tani et al. | 382/307 |
| 8,218,648 B2 | 7/2012 | Kishi et al. | 375/240.24 |
| 8,275,209 B2 * | 9/2012 | Schonberg et al. | 382/233 |
| 2002/0136295 A1 | 9/2002 | Sato | 375/240.03 |
| 2004/0028282 A1 * | 2/2004 | Kato et al. | 382/236 |
| 2004/0032968 A1 * | 2/2004 | Andrew et al. | 382/100 |
| 2005/0135484 A1 | 6/2005 | Lee et al. | 375/240.16 |
| 2005/0265608 A1 * | 12/2005 | Suino | 382/233 |
| 2006/0133684 A1 * | 6/2006 | Srinivasan et al. | 382/250 |
| 2007/0160299 A1 | 7/2007 | Kajiwara et al. | 382/240 |
| 2007/0171978 A1 * | 7/2007 | Chono | 375/240.18 |
| 2007/0286478 A1 * | 12/2007 | Kishi | 382/162 |
| 2008/0089413 A1 * | 4/2008 | Kishi et al. | 375/240.13 |
| 2008/0107403 A1 | 5/2008 | Urano | 386/124 |
| 2009/0003717 A1 * | 1/2009 | Sekiguchi et al. | 382/238 |
| 2009/0252232 A1 * | 10/2009 | Kishi et al. | 375/240.24 |
| 2009/0252427 A1 * | 10/2009 | Kishi et al. | 382/244 |
| 2009/0285498 A1 * | 11/2009 | Sakuyama | 382/233 |
| 2009/0297054 A1 | 12/2009 | Regunathan et al. | 382/248 |
| 2010/0034478 A1 | 2/2010 | Kajiwara et al. | 382/248 |
| 2010/0067810 A1 | 3/2010 | Kishi | 382/232 |
| 2010/0086223 A1 | 4/2010 | Daian et al. | 382/233 |
| 2010/0316304 A1 | 12/2010 | Kishi | 382/233 |

OTHER PUBLICATIONS

Hara, J., "Current report of standardization for the JPEG XR image compression", The Journal of the Institute of Image Electronics Engineers of Japan, vol. 37, No. 4, Jul. 25, 2008, pp. 502-512 (with translation).

"JPEG XR Leads to 8-Bit Tone Ultra Camera", 2008 Nikkei Electronics, Dec. 29, 2008, pp. 71-77.

* cited by examiner

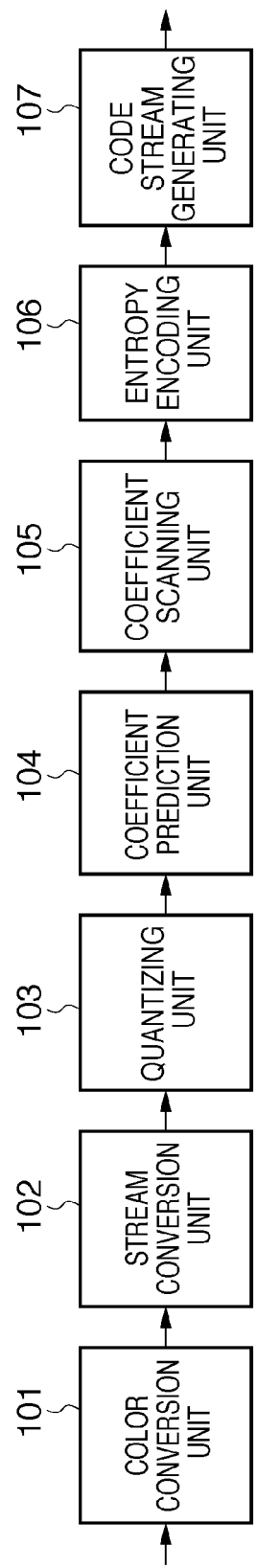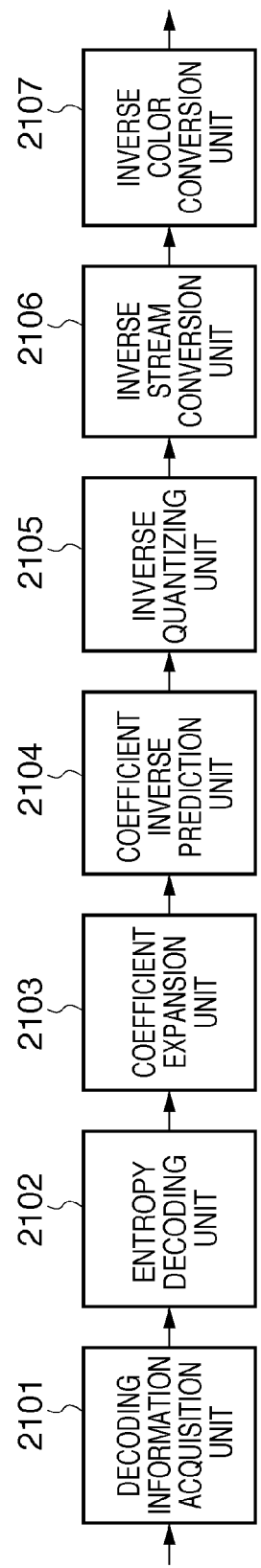

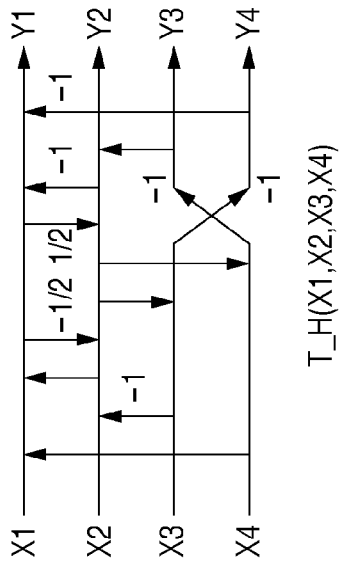
FIG. 7A
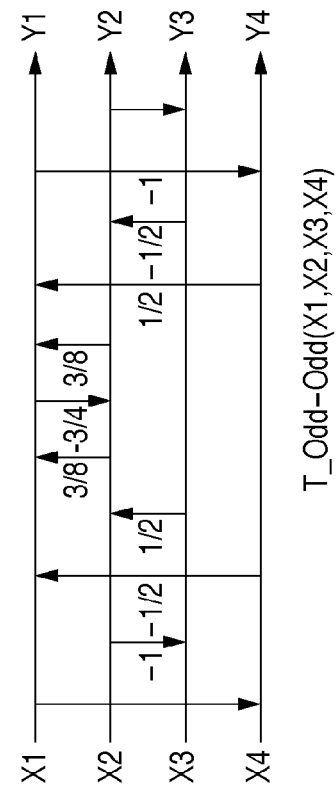
FIG. 7B
FIG. 7C
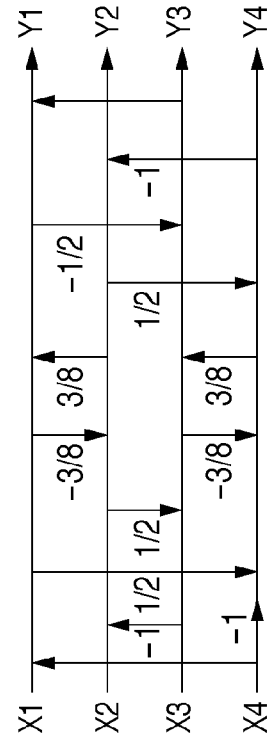
FIG. 7D

F I G. 11

|   | 1 | 2 | 3 |
|---|---|---|---|
| 4 | 5 | 6 | 7 |
| 8 | 9 | 10 | 11 |
| 12 | 13 | 14 | 15 |

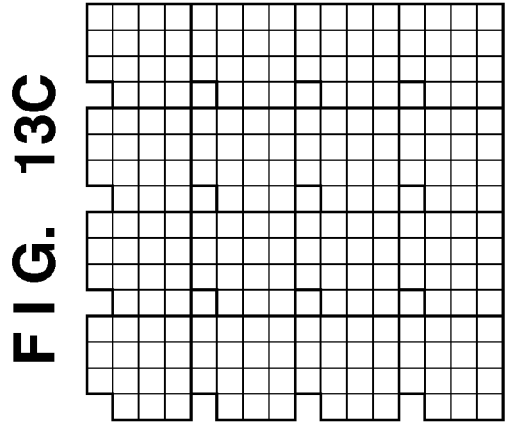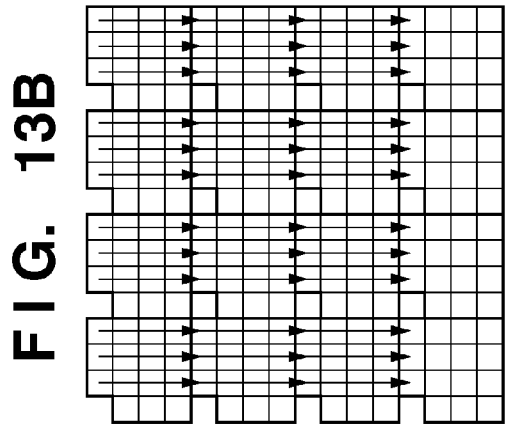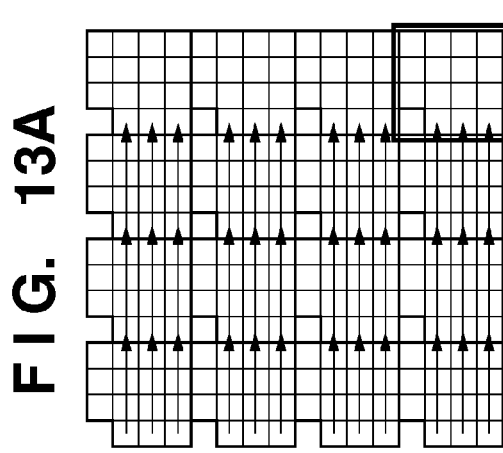
FIG. 13C
FIG. 13B
FIG. 13D
FIG. 13A

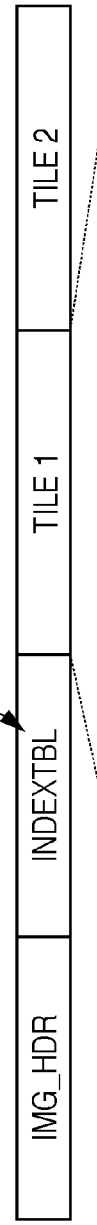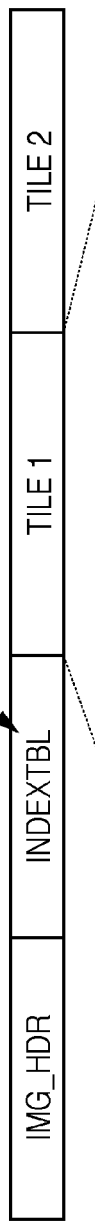

T_s(a,b)

T_Ro(a,b)

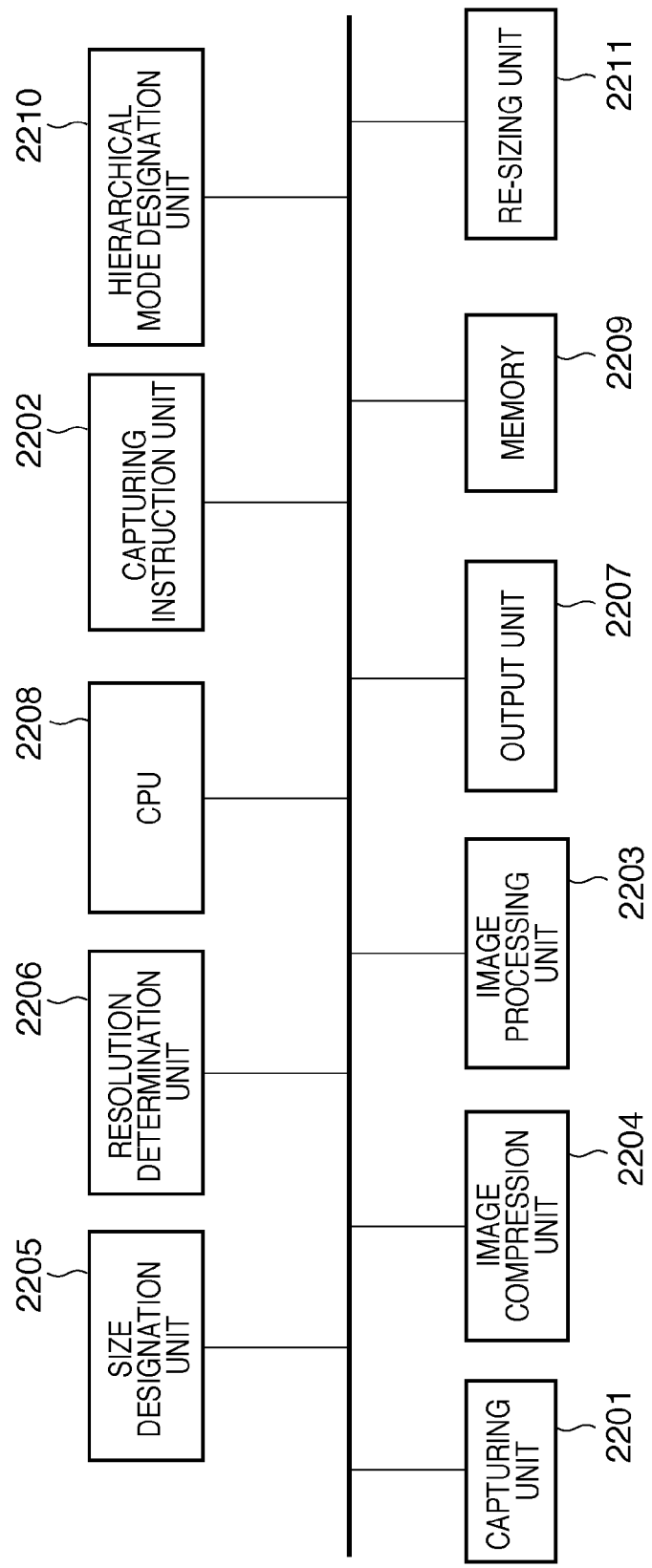

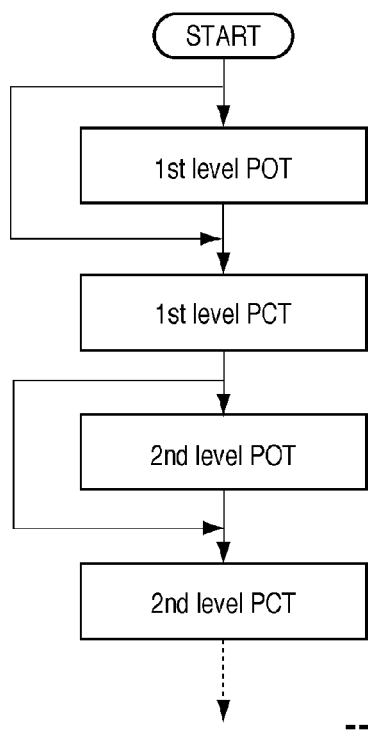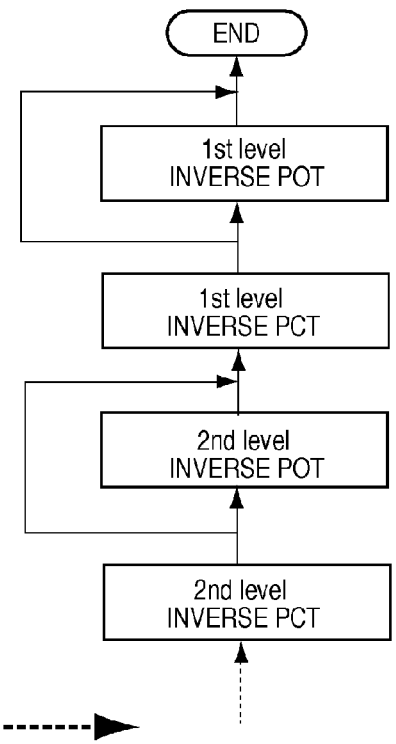

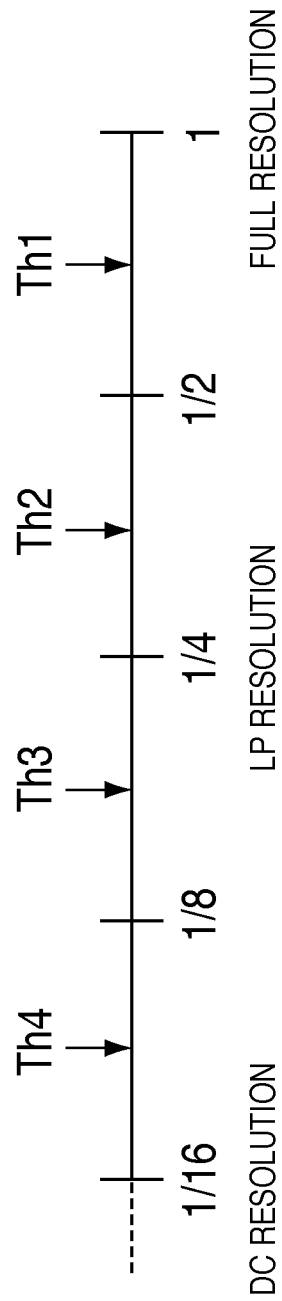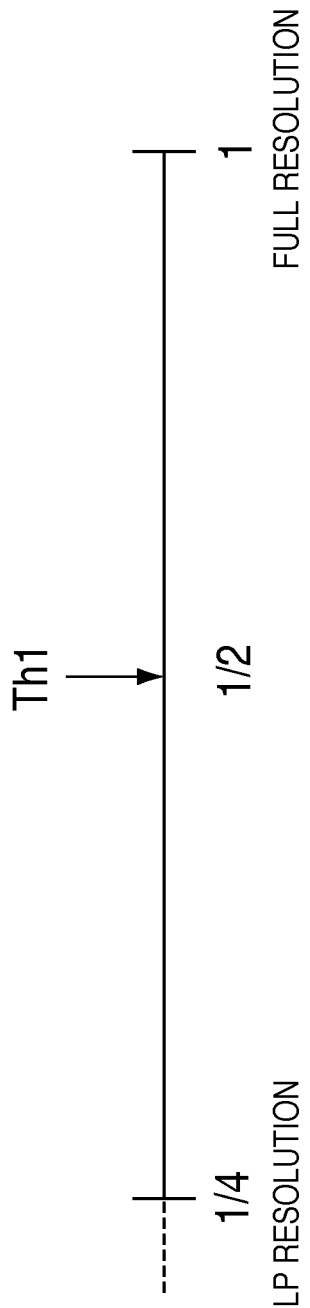

FIG. 24A

WHEN SC = 2

| VARIABLE MAGNIFICATION RATIO R | IMAGE SIZE IMMEDIATELY AFTER DECODING | 2ND LEVEL INVERSE PCT | 2ND LEVEL INVERSE POT | 1ST LEVEL INVERSE PCT | 1ST LEVEL INVERSE POT | LEVEL CORRECTION |
|---|---|---|---|---|---|---|
| Th4≥R | DC RESOLUTION | × | × | × | × | × |
| Th3≥R>Th4 | LP RESOLUTION | ○ | × | × | × | ○ |
| 1/4≥R>Th3 | LP RESOLUTION | ○ | ○ | × | × | × |
| Th2≥R>1/4 | LP RESOLUTION | ○ | ○ | ○ | × | × |
| Th1≥R>Th2 | FULL RESOLUTION | ○ | ○ | ○ | × | ○ |
| R>Th1 | FULL RESOLUTION | ○ | ○ | ○ | ○ | × |

FOR Th1 > Th2 > 1/4 > Th3 > Th4 > 1/16

FIG. 24B

WHEN SC = 1

| VARIABLE MAGNIFICATION RATIO R | IMAGE SIZE IMMEDIATELY AFTER DECODING | 2ND LEVEL INVERSE PCT | 2ND LEVEL INVERSE POT | 1ST LEVEL INVERSE PCT | 1ST LEVEL INVERSE POT | LEVEL CORRECTION |
|---|---|---|---|---|---|---|
| Th4≥R | DC RESOLUTION | × | × | × | × | × |
| Th3≥R>Th4 | LP RESOLUTION | ○ | × | × | × | × |
| 1/4≥R>Th3 | LP RESOLUTION | ○ | × | × | × | × |
| Th2≥R>1/4 | LP RESOLUTION | ○ | × | ○ | × | × |
| Th1≥R>Th2 | FULL RESOLUTION | ○ | × | ○ | × | ○ |
| R>Th1 | FULL RESOLUTION | ○ | × | ○ | ○ | × |

FOR Th1 > Th2 > 1/4 > Th3 > Th4 > 1/16

FIG. 24C

WHEN SC = 0

| VARIABLE MAGNIFICATION RATIO R | IMAGE SIZE IMMEDIATELY AFTER DECODING | 2ND LEVEL INVERSE PCT | 2ND LEVEL INVERSE POT | 1ST LEVEL INVERSE PCT | 1ST LEVEL INVERSE POT | LEVEL CORRECTION |
|---|---|---|---|---|---|---|
| Th4≥R | DC RESOLUTION | × | × | × | × | × |
| Th3≥R>Th4 | LP RESOLUTION | ○ | × | × | × | × |
| 1/4≥R>Th3 | LP RESOLUTION | ○ | × | × | × | × |
| Th2≥R>1/4 | LP RESOLUTION | ○ | × | × | × | × |
| Th1≥R>Th2 | FULL RESOLUTION | ○ | × | ○ | × | × |
| R>Th1 | FULL RESOLUTION | × | × | × | × | × |

FOR Th1 > Th2 > 1/4 > Th3 > Th4 > 1/16

IMAGE DECODING APPARATUS AND CONTROL METHOD FOR SPEEDING UP DECODING PROCESSING

BACKGROUND OF THE INVENTION

1. Field of the Invention

The present invention relates to a decoding technique for encoded image data.

2. Description of the Related Art

An encoding technique for image compression for a reduction in file size is indispensable for efficiently storing, managing, and transferring digital images. In general, when image data is to be encoded, the image is divided into several blocks, and encoding processing is performed on a block basis. When encoding is performed on a block basis, block boundaries tend to distort. Under the circumstance, an encoding technique that suppresses distortion at block boundaries is known (for example, Japanese Patent Laid-Open No. 2006-197573 to be referred to as reference 1 hereinafter). The technique disclosed in reference 1 divides an image into tiles. The technique then generates hierarchical stream data by repeating DCT for each tile. In order to suppress block distortion that occurs between tiles, this technique performs predetermined processing by using the pixels of two adjacent tiles before the execution of DCT or in the process of executing DCT. As such encoding processing, JPEG XR is known (e.g., "Current report of standardization for the JPEG XR image compression", The Journal of The Institute of Image Electronics Engineers of Japan, Vol. 37, No. 4, pp. 502-512, issued Jul. 25, 2008, and Nikkei Electronics, pp. 71-77, issued Dec. 29, 2008).

Processes based on the above technique include the processing of suppressing block distortion in the process of performing stream conversion processing. The user can select a process of his choice from these processes. Although this function can suppress distortion, the calculation cost for stream conversion processing increases double or more. The function of suppressing distortion includes processes in encoding processing and decoding processing that is designed to be performed in pair. That is, when a process has been performed at the time of encoding, a corresponding process is automatically performed at the time of decoding. A decoding apparatus, which decodes data encoded upon distortion suppression, always needs to perform a process corresponding to distortion processing, resulting in a delay in display, no matter how the user wants to display the data at high speed.

The maximum resolutions of recent digital cameras have been increasing. Such cameras generally have resolutions exceeding 10,000,000. However, display devices used in personal computers and the like have much lower resolutions than digital cameras. For the purpose of browsing instead of image editing and the like, therefore, it is sufficient for such display devices to display images having resolutions lower than original resolutions, and the devices are required to have high response between the instant an image to be displayed is designated and the instant the image is displayed.

SUMMARY OF THE INVENTION

The present invention therefore provides a technique of speeding up decoding processing by omitting several processes while reducing the influence of omission of processes on image quality in accordance with the variable magnification ratio at which an image is to be decoded and displayed.

In order to solve this problem, for example, an image decoding apparatus according to the present invention includes the following arrangement. That is, there is provided an image decoding apparatus which reproduces and outputs an image from encoded image data encoded by an encoding method configured to designate whether to perform distortion suppression processing of suppressing block distortion before each of two times of frequency conversion, the apparatus comprising:

a setting unit which sets a variable magnification ratio;

an analysis unit which analyzes a header of decoding target encoded image data and extracts encoding parameter information including at least an execution count of the distortion suppression processing;

a decoding unit which decodes the encoded image data up to data immediately before second frequency conversion at the time of encoding;

a determining unit which determines, based on the variable magnification ratio set by the setting unit and the encoding parameter information obtained by the analysis unit, which one of two inverse frequency conversion processes corresponding to the two times of frequency conversion executed when the encoded image data is generated and 0 to 2 times of inverse distortion suppression processing corresponding to the distortion suppression processing executed 0 to 2 times when the encoded image data is generated is configured to be omitted;

a restoration unit which restores an image on which an output is based, by executing processing configured not to be omitted, based on a determination result obtained by the determining unit; and a re-sizing unit which re-sizes the image restored by the restoration unit in accordance with the variable magnification ratio set by the setting unit and outputs the image.

According to the present invention, it is possible to speed up decoding processing by omitting several processes while reducing the influence of omission of processes on image quality in accordance with the variable magnification ratio at which an image is to be decoded and displayed.

Further features of the present invention will become apparent from the following description of exemplary embodiments (with reference to the attached drawings).

BRIEF DESCRIPTION OF THE DRAWINGS

FIGS. 1A and 1B are block diagrams of an image compression unit and decompression unit;

FIGS. 7A to 7D are views showing the pixel positions in a block in frequency conversion processing and the structure of three filters;

FIG. 11 is a view showing the data arrangement of process target blocks of low-pass component prediction;

FIGS. 13A to 13D are views showing the relationship between the scanning direction and the data arrangement of process target blocks of low-pass component prediction;

FIGS. 15A and 15B are views showing the data structure of encoded data;

FIG. 18 is a block diagram of a digital camera;

FIGS. 22A and 22B are flowcharts for encoding processing and decoding processing;

FIGS. 23A and 23B are views showing thresholds for variable magnification ratios in the second and third embodiments; and FIGS. 24A to 24C are tables showing the types of processes to be executed/unexecuted in the second embodiment.

DESCRIPTION OF THE EMBODIMENTS

Figure 2:
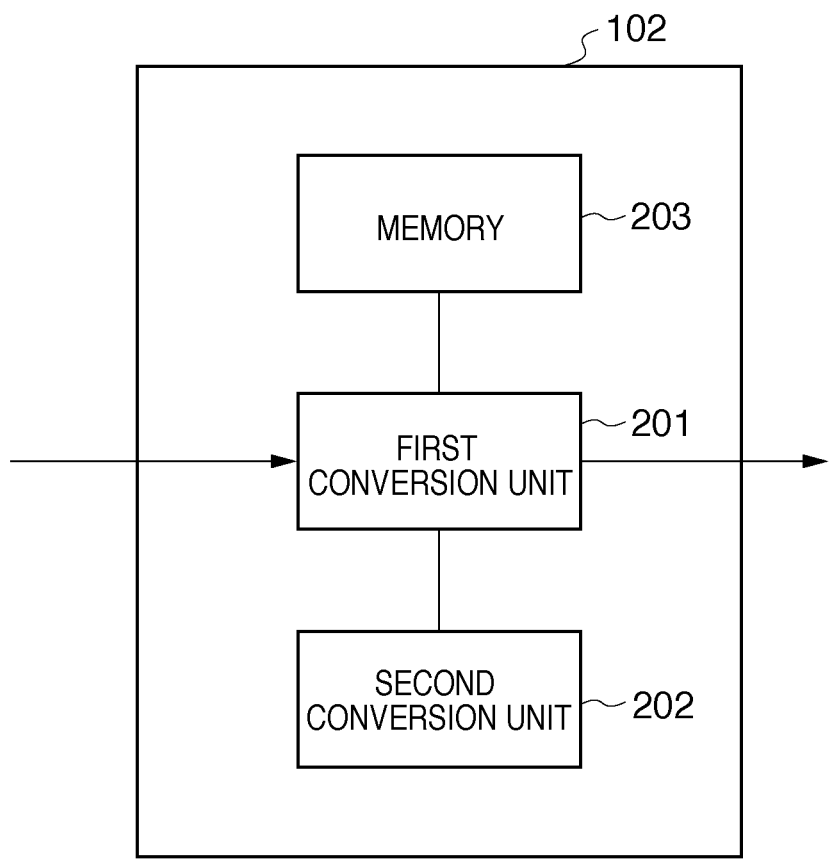
FIG. 2 is a block diagram of a stream conversion unit.

The embodiments of the present invention will be described in detail below with reference to the accompanying drawings.

[First Embodiment]

The technique (JPEG XR) based on reference 1 described above and the like has a block distortion suppression function used in encoding. The suppression processing is optional. That is, the user can designate one of the following three options: (1) perform no processing; (2) perform processing once before first stream conversion; and (3) perform processing once before first stream conversion, and once before second stream conversion. Option (1) allows high-speed encoding and decoding without any distortion suppressing effect. Option (3) provides a strong distortion suppressing effect, even though the encoding and decoding speeds are low. Option (2) comes between option (1) and option (3) in terms of effects. FIG. 22A shows a summary of the above description. Referring to FIG. 22A, "PCT" indicates stream conversion (frequency conversion) processing, and "POT" indicates distortion suppression processing.

Decoding processing is inverse to encoding processing. In general, therefore, if option (1) is performed at the time of encoding, no distortion suppression processing is performed at the time of decoding. If option (3) is performed, distortion suppression processing is performed twice at the time of decoding. FIG. 22B shows this decoding processing. In this case, if the processes in options (2) and (3) have been performed at the time of encoding, skipping distortion suppression processing at the time of decoding of a full-resolution image can shorten the processing time. However, the image quality degrades. When encoded image data having undergone option (3) at the time of encoding is to be decoded and displayed at the full resolution, skipping the second distortion suppression processing will greatly affect image quality.

If distortion lowers the resolution, as described above, displaying a decoded image upon reduction will make the distortion less noticeable. This embodiment therefore shows an example of omitting distortion suppression processing as much as possible while reducing the influence of omission of processing on image quality in accordance with the resolution (variable magnification ratio) designated by a user, when decoding and displaying images, instead of uniformly performing the same processing.

In this embodiment, a digital camera captures an image, and copies the image onto a storage device with a viewing function like an HDD recorder. Assume in the following description that an image is copied onto the storage device and is then displayed on a display. The digital camera will be described first, and then the reproduction processing (decoding processing) of the storage device will be described.

[Explanation of Digital Camera]

The digital camera has the arrangement shown in FIG. 18. That is, the digital camera includes a capturing unit 2201, a capturing instruction unit 2202, an image processing unit 2203, an image compression unit 2204, a size designation unit 2205, a resolution determination unit 2206, an output unit 2207, a hierarchical mode designation unit 2210, and a re-sizing unit 2211. The digital camera includes a CPU 2208 functioning as a control unit for the overall apparatus and a memory 2209 which stores programs to be executed by the CPU 2208 and is used as a work area. The memory 2209 also stores various types of setting information. Assume that the user designates the size designation unit 2205 and the hierarchical mode designation unit 2210 by operating buttons provided on an operation panel (not shown) or by menu selection. The capturing instruction unit 2202 can be simply expressed as a shutter button.

On the digital camera of the embodiment, the user can designate, via the size designation unit 2205, the resolution (size) of an image to be captured before capturing. Three sizes L, M, and S are selectable. The size L is 4000 horizontal pixels×3000 vertical pixels (to be referred to as 4000×3000 pixels hereinafter). The size M is 2000×1500 pixels. The size S is 1600×1200 pixels. That is, the capturing unit 2201 of the digital camera of the embodiment includes an image sensing element having a resolution of 4000×3000 pixels. Information representing the selected size is stored in a preset area of the memory 2209.

As described above, when the user operates the shutter button included in the capturing instruction unit 2202 after setting a resolution via the size designation unit 2205, the digital camera captures an image with the designated resolution. The digital camera then performs image processing (e.g., white balance processing) and performs encoding processing (to be described later). The camera then stores the generated encoded data in the nonvolatile memory card connected to the output unit 2207.

Figure 19:
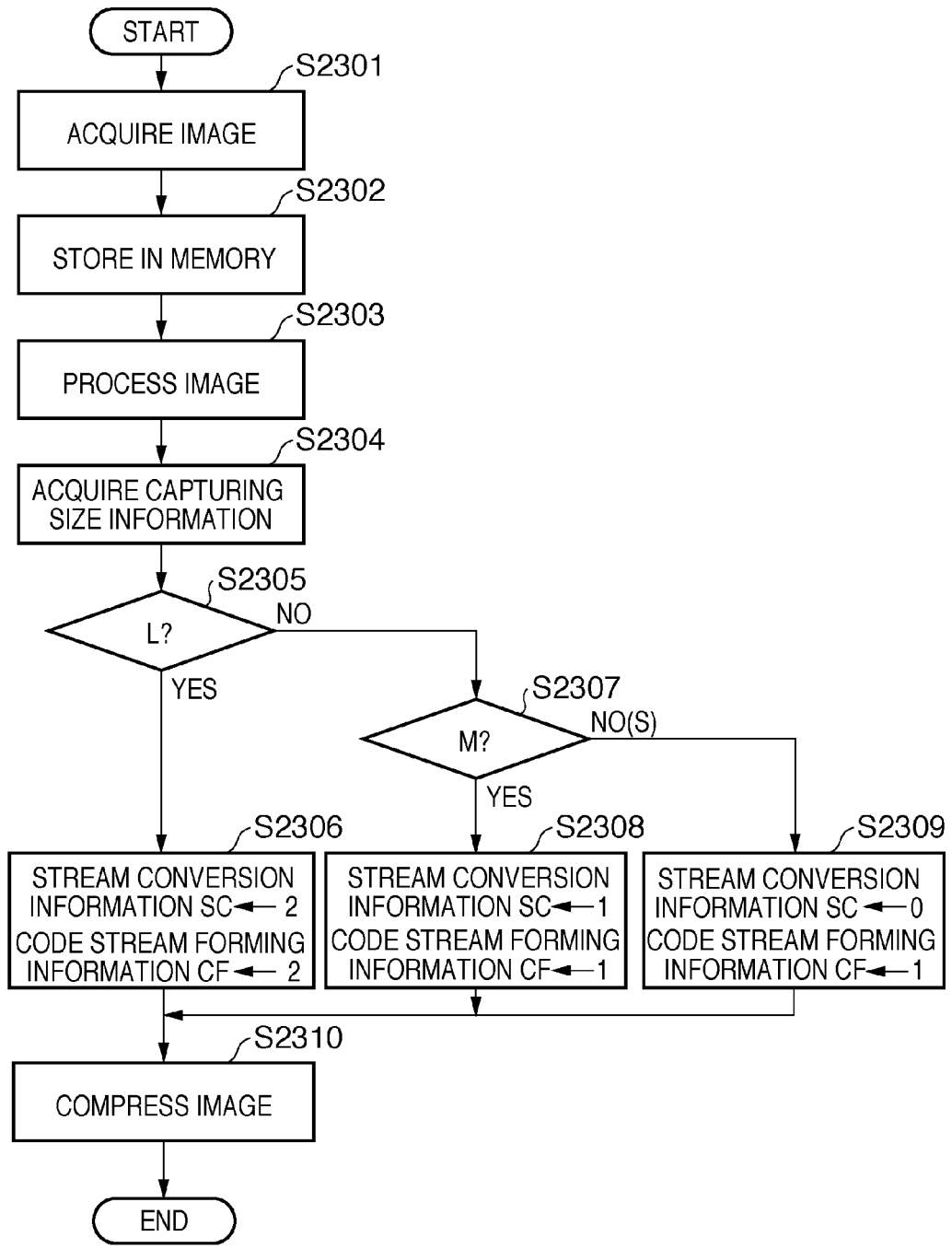
FIG. 19 is a flowchart for processing in the digital camera.

FIG. 19 is a flowchart illustrating the processing procedure to be performed by the CPU 2208 when the user operates the shutter button. Note that processing such as AF and AE is not directly relevant to the present invention, and hence a description of the processing will be omitted. A processing procedure will be described below with reference to the flowchart of FIG. 19.

First, the CPU 2208 converts a photoelectrically converted signal obtained by the capturing unit 2201 into digital data, acquires the converted data as image data (step S2301), and temporarily stores it in the memory 2209 (step S2302).

The CPU 2208 controls the image processing unit 2203 and causes it to execute image processing of the image data stored in the memory 2209 (step S2303). The image processing includes processing of converting RGB data in a Bayer matrix into a normal arrangement, white balance processing, sharpness processing, and color processing. The image data as the image processing result is stored in the memory 2209 again. After the image processing, the process advances to step S2304. The CPU 2208 acquires set size information from the memory 2209 (step S2304), and determines the size designated by the user (step S2305).

If the size L is designated (YES in step S2305), the CPU 2208 sets "2" in each of two pieces of information about image compression, i.e., stream conversion information SC and code stream forming information CF, and sets them in the image compression unit 2204 (step S2306). That is, the stream conversion information SC and code stream forming information CF can be regarded as parameters for image compression of the image compression unit 2204.

The stream conversion information SC and the code stream forming information CF will be described later in detail. In this embodiment, the stream conversion information SC takes three values "0", "1", and "2". "2" instructs the processing of improving image quality at an intermediate resolution. The stream conversion information SC is also used as information representing the execution count of distortion suppression processing to be described later. The code stream forming information CF takes two values "1" and "2". "2" instructs code stream formation of intermediate resolution priority. When both the stream conversion information SC and the code stream forming information CF are "2", the sequence involves complex processing, and the time required for processing increases. However, an L-size image has an enormous number of pixels and is therefore rarely displayed at the maximum resolution in actual display step. It will probably be displayed at an intermediate resolution lower by some grades than the maximum resolution. In this embodiment, if the size L is set, both the stream conversion information SC and the code stream forming information CF are set to "2", as described above, to perform processing corresponding to processing after display processing.

If the designated size is not L (if the size M or S is designated), the process advances to step S2307. The CPU 2208 determines whether the designated size is M. If the size M is designated, the CPU 2208 sets the stream conversion information SC "1" and the code stream forming information CF "1" in the image compression unit 2204 in step S2308.

Upon determining that the designated size is not M, i.e., the size S is set, the CPU 2208 sets the stream conversion information SC "0" and the code stream forming information CF "1" in the image compression unit 2204 in step S2309.

The process advances to step S2310 to cause the image compression unit 2204 to start compression processing. The CPU 2208 then stores the generated encoded data as a file in a memory card.

The image compression unit 2204 in this embodiment will be described in detail next. The image compression unit 2204 in this embodiment generates hierarchical encoded data having a hierarchical structure by using the technique disclosed in reference 1 described above. The characteristic features of this embodiment will be described below based on this technique.

As shown in FIG. 1A, the arrangement of the image compression unit 2204 in this embodiment includes a color conversion unit 101, a stream conversion unit 102, a quantizing unit 103, a coefficient prediction unit 104, a coefficient scanning unit 105, an entropy encoding unit 106, and a code stream generating unit 107. Prior to a description of the processing of an image compression unit 2104 in this embodiment, terms will be defined. "Block" is the minimum unit of encoding processing and has a size of 4×4 pixels in the embodiment. "Macro block" is a unit containing a plurality of blocks, which are 4×4 blocks (i.e., 16×16 pixels) in the embodiment. "Tile" is a unit containing a plurality of macro blocks, which are M×N (M and N are integers of 1 or more, and one of them is 2 or more) macro blocks. In the embodiment, M=6, and N=4. That is, one tile has a size corresponding to 6×4 macro blocks=96×64 pixels. The definitions of a block, macro block, and tile here are merely examples, and their sizes do not limit the present invention. The image compression unit 2104 compression-codes each tile. The minimum unit of the processing is a block (4×4 pixels).

The color conversion unit 101 converts RGB data (in the embodiment, each component has 8 bits=256 tones) into a YUV color space, and outputs the conversion result to the stream conversion unit 102. For example, RGB→YUV conversion is performed according to the following conversion formula:

$$V = B - R$$

$$t = R - G + \text{Ceiling}(V/2)$$

$$U = -t$$

$$Y = G + \text{Floor}(t/2)$$

where Ceiling(x) is a function that returns the minimum integer equal to or more than a real number x, and Floor(x) is a function that returns the maximum integer equal to or less than the real number x.

The Y, U, and V components are individually encoded. For the sake of simplicity, Y (luminance) will be explained below. Note that image data in the following description indicates image data expressed by the Y component (the U and V components can be understood by properly substituting them for the Y component).

The stream conversion unit 102 includes a first conversion unit 201, a second conversion unit 202, and a memory 203, as shown in FIG. 2. The first conversion unit 201 performs essential processing and also controls the stream conversion unit 102. The second conversion unit 202 performs optional processing which need not always be executed. The first conversion unit 201 is in charge of handling to determine whether to cause the second conversion unit 202 to execute processing. If the second conversion unit 202 executes processing, the load on encoding processing and the time required for the processing increase. However, a decoded image (especially, an image having a resolution lower than the original resolution) has a more desirable image quality. The memory 203 holds the above-described stream conversion information SC.

Figure 3:
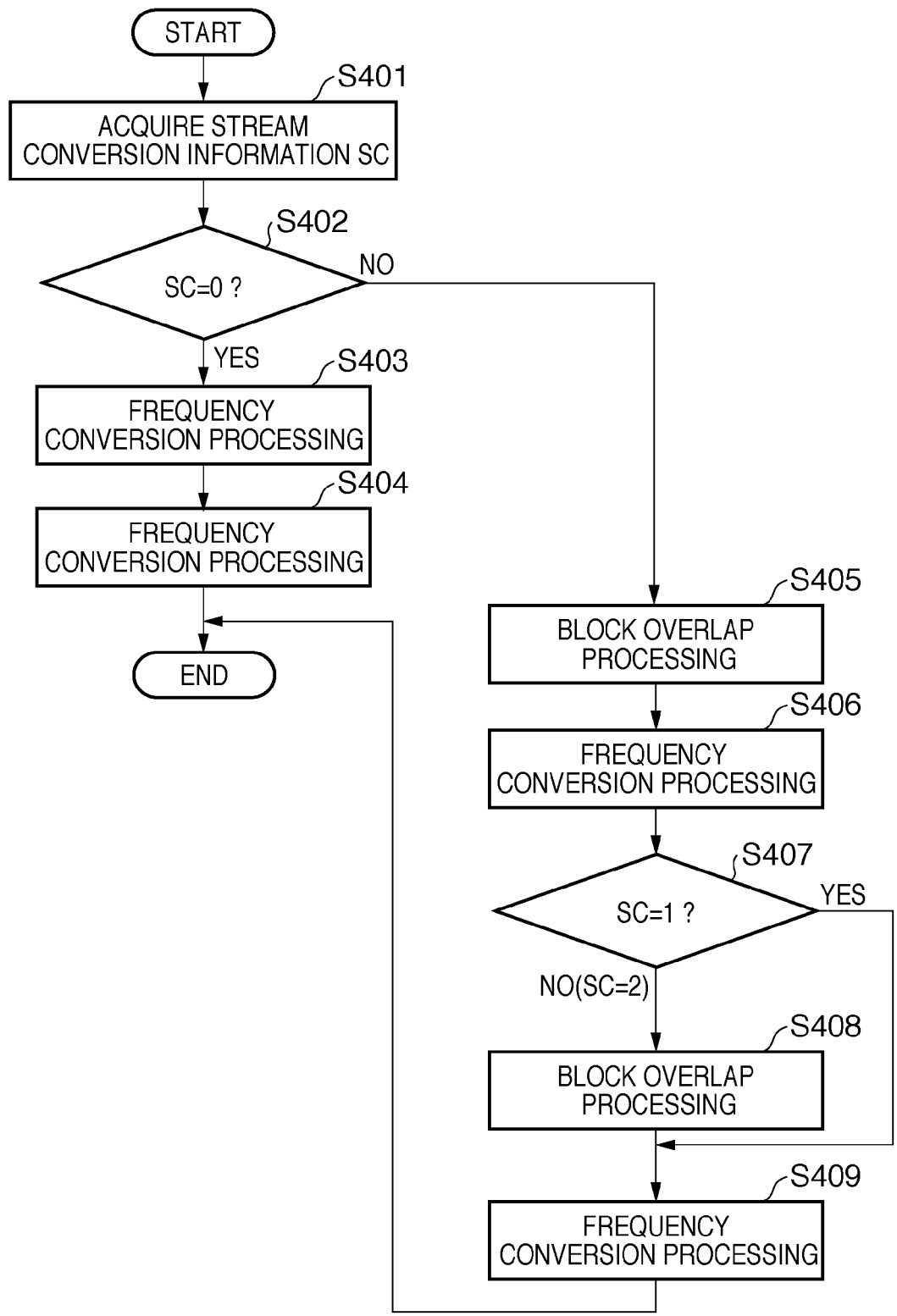
FIG. 3 is a flowchart illustrating the processing procedure of the stream conversion unit.
Figure 4:
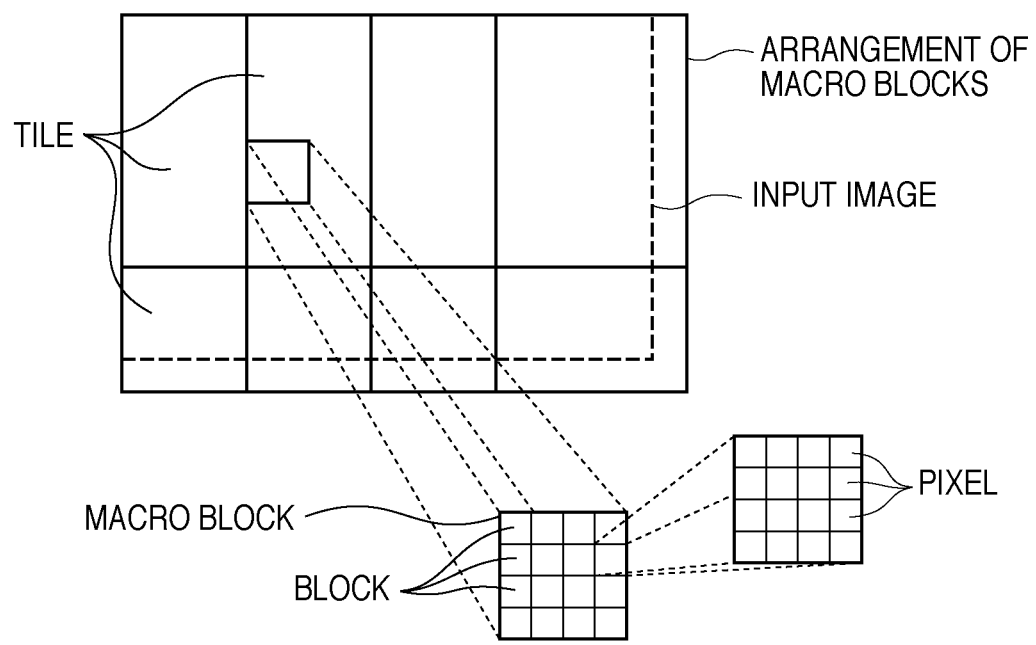
FIG. 4 is a view showing the relationship between the tiles, macro blocks, and blocks in an image.

The stream conversion unit 102 receives Y component data, and segments the image into tiles, as shown in FIG. 4 (in the embodiment, one tile includes 6×4 macro blocks). The memory 203 stores the stream conversion information SC ("0", "1", or "2"). The first conversion unit 201 and the second conversion unit 202 execute processing in accordance with the flowchart of FIG. 3.

In step S401, the first conversion unit 201 acquires the stream conversion information SC from the memory 203. In step S402, the first conversion unit 201 determines whether the stream conversion information SC is "0". If the stream conversion information SC is "0", the first conversion unit 201 does not request conversion processing of the second conversion unit 202. The first conversion unit 201 executes frequency conversion processing twice in steps S403 and S404. This processing will be described in detail with reference to FIG. 5.

First, each of 4×4 blocks included in one macro block undergoes frequency conversion processing (first stage). One DC component (direct current component) data and 15 (=4×4−1) AC component (alternating current component) data are obtained from one block. As described above, one macro block includes 4×4 blocks. Hence, 4×4 DC component data and 15×4×4 AC component data are obtained from one macro block. A set of 4×4 component values will be called a DC block. This is the process in step S403, i.e., the first frequency conversion processing.

The process in step S404 (second frequency conversion processing) will be described next. The target of the second frequency conversion in step S404 is the above-described DC block (second stage). As a result, one DC component value and 15 AC component values are obtained from the DC block. The latter AC component values are calculated from the DC components of the DC block (4×4 pixels) and are therefore represented as ACDC components in FIG. 5.

To discriminate the components generated in steps S403 and S404, the DC component data and the AC component data obtained in the first process (step S403) may be called DC component data of first level and AC component data of first level, respectively. The DC component data and the ACDC component data obtained in the second process (step S404) may be called DC component data of second level and AC component data of second level, respectively.

Figure 6:
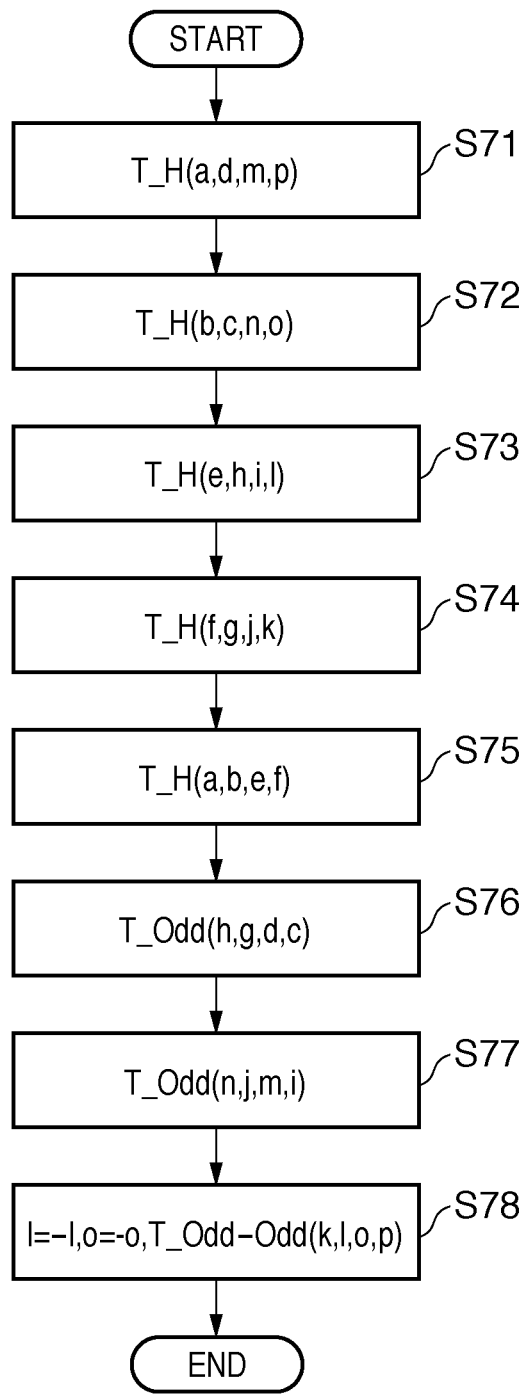
FIG. 6 is a flowchart illustrating the processing procedure of frequency conversion processing.

The frequency conversion processing is performed in accordance with the procedure of the flowchart of FIG. 6. Note that the flowchart illustrates processing of one block (4×4 pixels). That is, since a macro block includes 4×4 blocks, processing conforming to the flowchart of FIG. 6 is performed 16 times in the first frequency conversion processing (step S403). Conversion processing (filtering processing) in each of steps S71 to S78 of the flowchart of FIG. 6 is performed by one of conversion circuits (filtering circuits) shown in FIGS. 7B to 7D, which has the same name as the processing. Arguments "a" to "p" of each conversion processing in FIG. 6 correspond to pixel positions "a" to "p" in a block of interest shown in FIG. 7A.

First conversion processing T_H(a, d, m, p) in step S71 of FIG. 6 is executed by the circuit arrangement shown in FIG. 7B. More specifically, a, d, m, and p in FIG. 7A are set in input terminals X1, X2, X3, and X4 in FIG. 7B, respectively, and calculation starts. The initial values of a, d, m, and p are updated to four values that appear at output terminals Y1, Y2, Y3, and Y4. This also applies to processing in steps S72 to 578. In step S78, after the signs of the data 1 and o are reversed, T_Odd_Odd calculation processing (FIG. 7D) is executed.

Simply put, in the first four processes (steps S71 to S74) for the DC components of the processing in FIG. 6, temporary low frequency components obtained from the data of the block of interest (4×4 pixels) are concentrated to the 2×2 positions (a, b, e, and f in FIG. 7A) of the upper left corner. In step S75, one DC component of the block of interest is stored at the position "a" in FIG. 7A using the data of the 2×2 temporary low frequency components stored at the positions {a, b, e, f} of the upper left corner. The 15 AC components are generated by the processes in steps S71 to S78.

The first frequency conversion processing is performed for each of the 16 blocks included in the macro block of interest in FIG. 6. In the second frequency conversion processing, processing represented by the flowchart of FIG. 6 is performed once, regarding that the DC block (4×4 DC component values) obtained from the macro block of interest has the arrangement shown in FIG. 7A.

As described above, the two frequency conversion processes yield one DC component, 15 (=4×4−1) ACDC components, and 240 (=15×4×4) AC components from one macro block. As easily understood by those skilled in the art, the size of the image obtained by decoding only the encoded data of the DC component of this macro block is 1/16 the size of the original image in both the horizontal and vertical directions. The size of the image obtained by decoding only the encoded data of the DC and ACDC components is ¼ the size of the original image in both the horizontal and vertical directions. The image obtained by decoding all the DC, ACDC, and AC components has the same size as that of the original image.

Encoding processing of the embodiment generates encoded data of each tile. In the embodiment, one tile includes 6×4 macro blocks. Hence, the processes in steps S403 and S404 are repeated as many times as the macro blocks included in one tile.

Referring back to FIG. 3, if the first conversion unit 201 determines in step S402 that the stream conversion information SC acquired from the memory 203 is not "0", i.e., SC=1 or 2, the process advances to step S405. In step S405, the first conversion unit 201 instructs the second conversion unit 202 to start conversion processing.

The second conversion unit 202 performs correction processing across (overlapping) a block boundary to correct its distortion that occurs because the processing of the first conversion unit 201 is based on calculation in each block. The processing of the second conversion unit 202 will be referred to as block overlap processing hereinafter.

Figure 8:
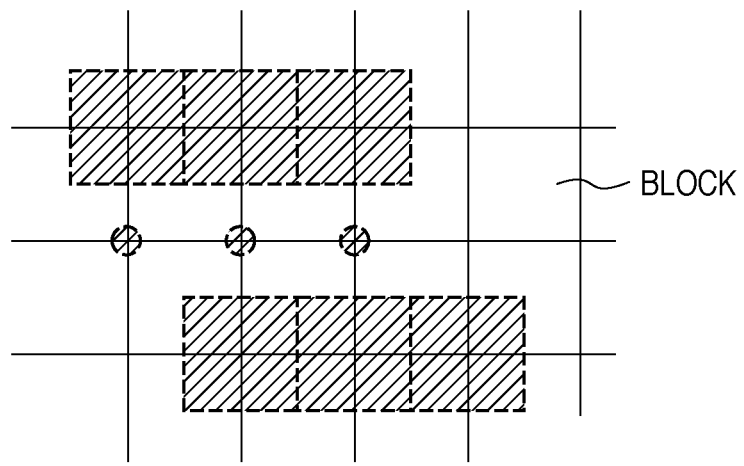
FIG. 8 is a view showing a target of block overlap processing.
Figure 16:
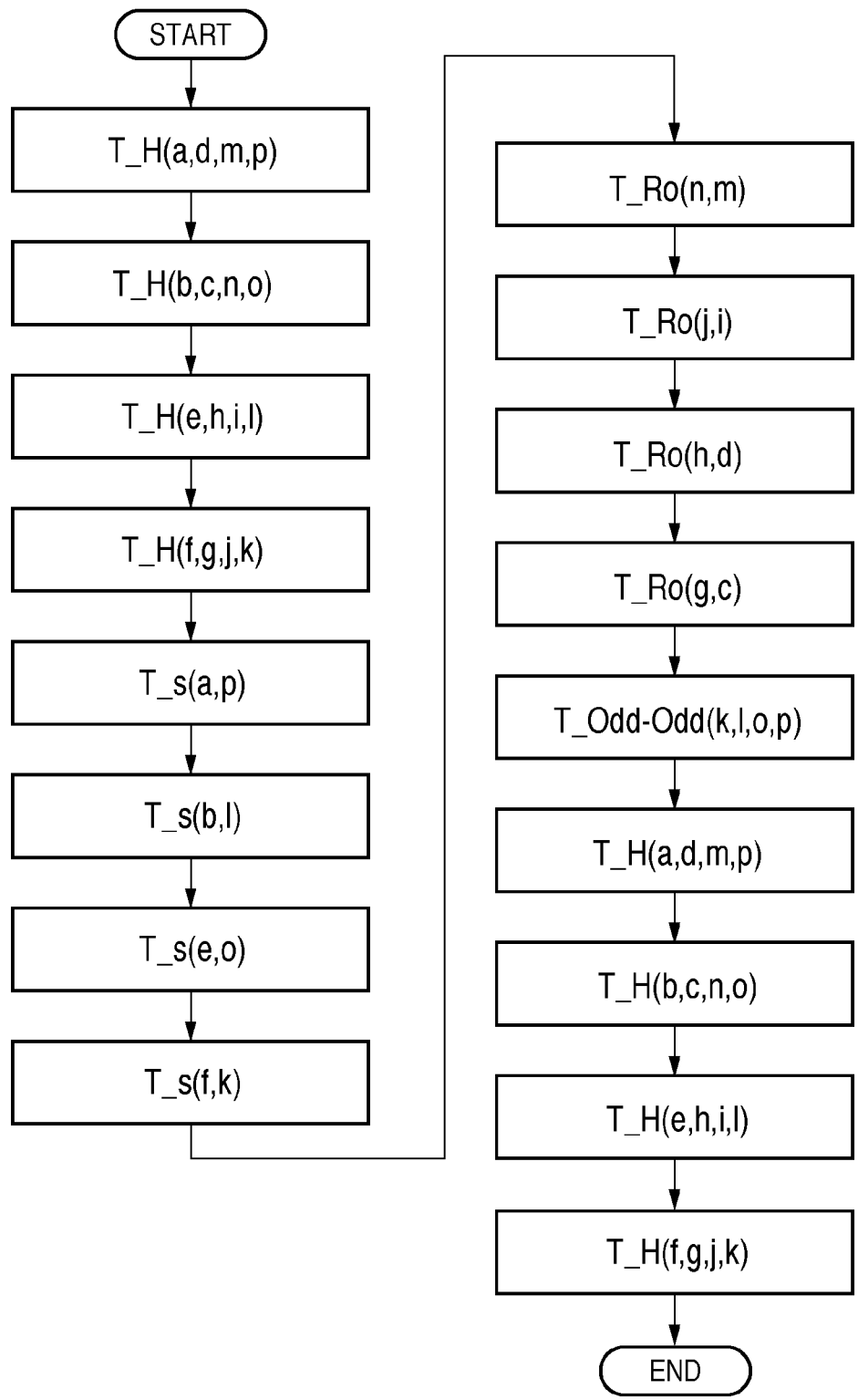
FIG. 16 is a flowchart for block overlap processing.
Figure 17A:
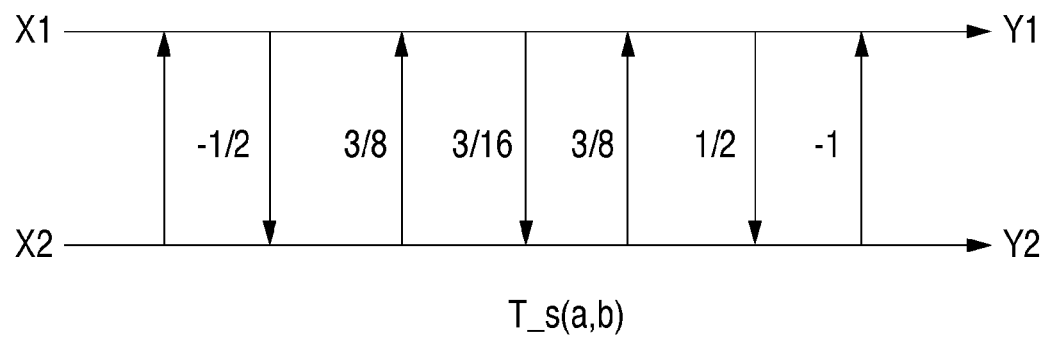
FIGS. 17A and 17B are views each showing a circuit arrangement associated with block overlap processing.
Figure 17B:
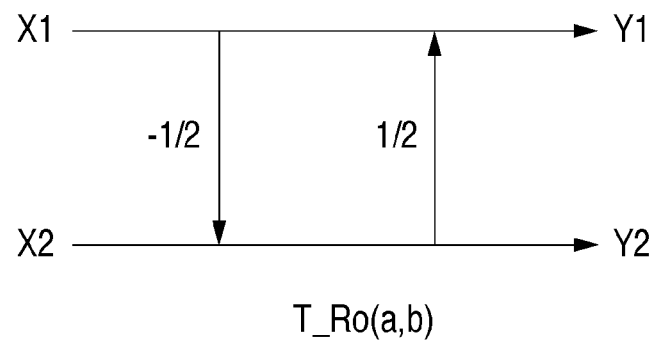

Upon receiving an activation instruction from the first conversion unit 201, the second conversion unit 202 performs block overlap processing using a window across (overlapping) the boundary between blocks (4×4 pixels) in an input tile, as shown in FIG. 8 (step S405). The block overlap processing is illustrated by the flowchart of FIG. 16. In FIG. 16, two filtering processes, i.e., T_s( ) and T_Ro( ) are added to the above-described processing shown in the flowchart of FIG. 6. The circuit arrangements shown in FIGS. 17A and 17B implement T_s( ) and T_Ro( ) T_s( ) and T_R processing are 2-input 2-output filtering processes. The block overlap processing processes a range across the process target blocks of the above-described frequency conversion processing, thereby suppressing discontinuity at the block boundary of frequency conversion.

Then, the process advances to step S406. The first conversion unit 201 performs frequency conversion processing once. The frequency conversion processing in step S406 is executed for each of 4×4 blocks in a region corresponding to the macro block in FIG. 5. That is, 16 blocks are frequency-converted to calculate 16 DC components and 240 AC components, as in step S403. In the embodiment, one tile includes 6×4 macro blocks. Hence, the processing is executed 24 times.

Next, in step S407, the first conversion unit 201 determines whether the stream conversion information SC acquired from the memory 203 is "1". If it is determined that the stream conversion information SC is "1", the process advances to step S409. If it is determined that the stream conversion information SC is not "1", i.e., "2", the process advances to step S408 to cause the second conversion unit 202 to execute second block overlap processing (FIG. 16). Note that 6×4 DC blocks are targeted for the block overlap processing executed by the second conversion unit 202 in step S408. In step S409, second frequency conversion processing is executed. The second frequency conversion processing is the same as in step S404 except that it targets the set of a plurality of DC blocks included in one tile that has undergone the process in step S406 or S408. More specifically, one tile includes 6×4 macro blocks, and one DC block is generated from one macro block. Hence, the frequency conversion is executed for 24 DC blocks.

The above-described processing will be summarized. The sequence of processing for a macro block according to the embodiment is as follows.

When the size of an image to be captured is S:
  Frequency conversion processing→frequency conversion processing
When the size of an image to be captured is M:
  Block overlap processing→frequency conversion processing→frequency conversion processing
When the size of an image to be captured is L:
  Block overlap processing→frequency conversion processing→block overlap processing→frequency conversion processing The processing of the stream conversion unit 102 in FIG. 1A has been described above. The stream conversion unit 102 outputs the conversion result to the quantizing unit 103 of the succeeding stage. The quantizing unit 103 sets a Q parameter (to be referred to as a QP hereinafter), and calculates a quantization step based on the set QP and the following conversion formula:

When QPindex≦1, QP=QPindex.

When QPindex>16, QP=((QPindex % 16)+16)<<(((QPindex>>4)−1) (where x % y is a function that returns the quotient of the division x/y, x<<y is a function that shifts a value x by y bits to the left (the more significant side), and x>>y is a function that shifts the value x by y bits to the right (the less significant side))

Note that according to this embodiment, there are following three degrees of freedom in setting a QP to be described here, and a QP can be set by combining them.

Axis of degree of freedom 1: spatial degree of freedom:
  1.1 Set a single QP for all macro blocks in an image
  1.2 Set a single QP for all macro blocks in a tile
  1.3 Freely set a QP for each macro block in a tile
  Axis of degree of freedom 2: frequency degree of freedom:
  2.1 Set a single QP for all frequency components
  2.2 Set a single QP for DC components and low-pass components (ACDC components), and different QPs for high-pass components (AC components)
  2.3 Set a single QP for low-pass and high-pass components, and different QPs for DC components
  2.4 Set a QP for each frequency component
  Axis of degree of freedom 3: color plane degree of freedom:
  3.1 Set a single QP for all color planes
  3.2 Set a QP for a luminance plane, and a single QP for planes other than the luminance plane
  3.3 Set a QP for each plane For example, quantization in conventional JFIF is done based on spatial degree of freedom 1.1 and color plane degree of freedom 3.2. Note that JFIF assigns a quantization step to each coefficient in a macro block and therefore has no item corresponding to the frequency degree of freedom.

The quantizing unit 103 thus ends the quantization processing and outputs the quantized data to the coefficient prediction unit 104. The coefficient prediction unit 104 performs coefficient prediction and outputs a prediction error. Coefficient prediction is executed based on different rules for the DC components, low-pass components (ACDC components), and high-pass components (AC components). A prediction calculation method is decided for each tile. A coefficient of an adjacent tile is not used. Prediction calculation of each component by the coefficient prediction unit 104 will be described below.

(1) DC Component Prediction

Figure 5:
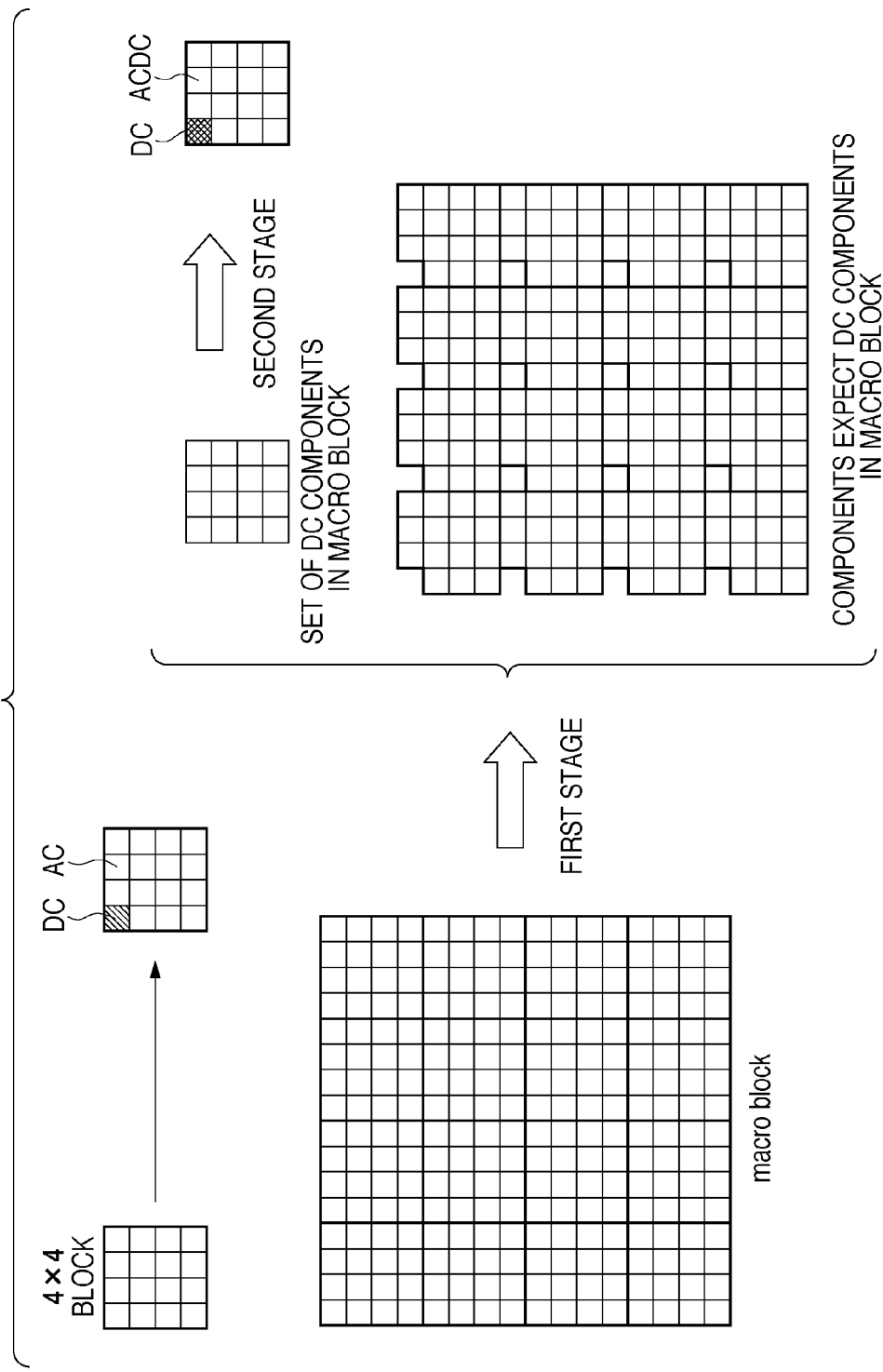
FIG. 5 is a view for explaining stream conversion processing.

As described above, in the embodiment, one tile includes 6×4 macro blocks. One DC component is obtained from one macro block (FIG. 5). Hence, 6×4 DC components that have undergone the quantization processing are obtained from one tile. DC component prediction processing (prediction error calculation processing) of the coefficient prediction unit 104 will be described.

Figure 9:
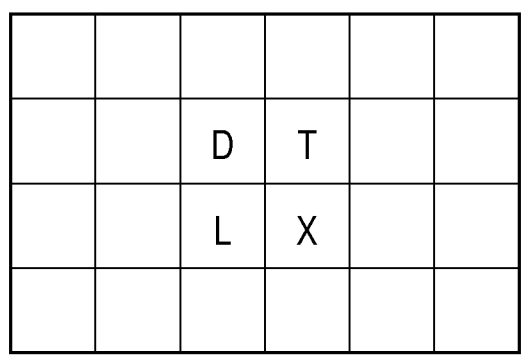
FIG. 9 is a view for explaining a method of predicting a DC component X of interest.

DC component values in one tile are raster-scanned. FIG. 9 shows the relationship between a DC component X of a macro block of interest and neighboring DC components D, T, and L relatively adjacent to the DC component X during scanning processing of a tile. Note that in raster scanning, the neighboring DC components D, T, and L near the DC component X of interest are located at positions where prediction processing (prediction error calculation) has already ended. When the DC component X of interest is at the upper left corner, all the neighboring DC components D, T, and L are located outside the tile. When the DC component X of interest is on the first line except the upper left corner, the neighboring DC components D and T are located outside the tile. When the DC component X of interest is on the left edge except the upper left corner, the neighboring DC components D and L are located outside the tile. The neighboring DC components outside the tile to be referred to are assumed to have a predetermined value (e.g., "0"). The predetermined value need not always be "0" if it is the same as in the image decoding apparatus.

Figure 10:
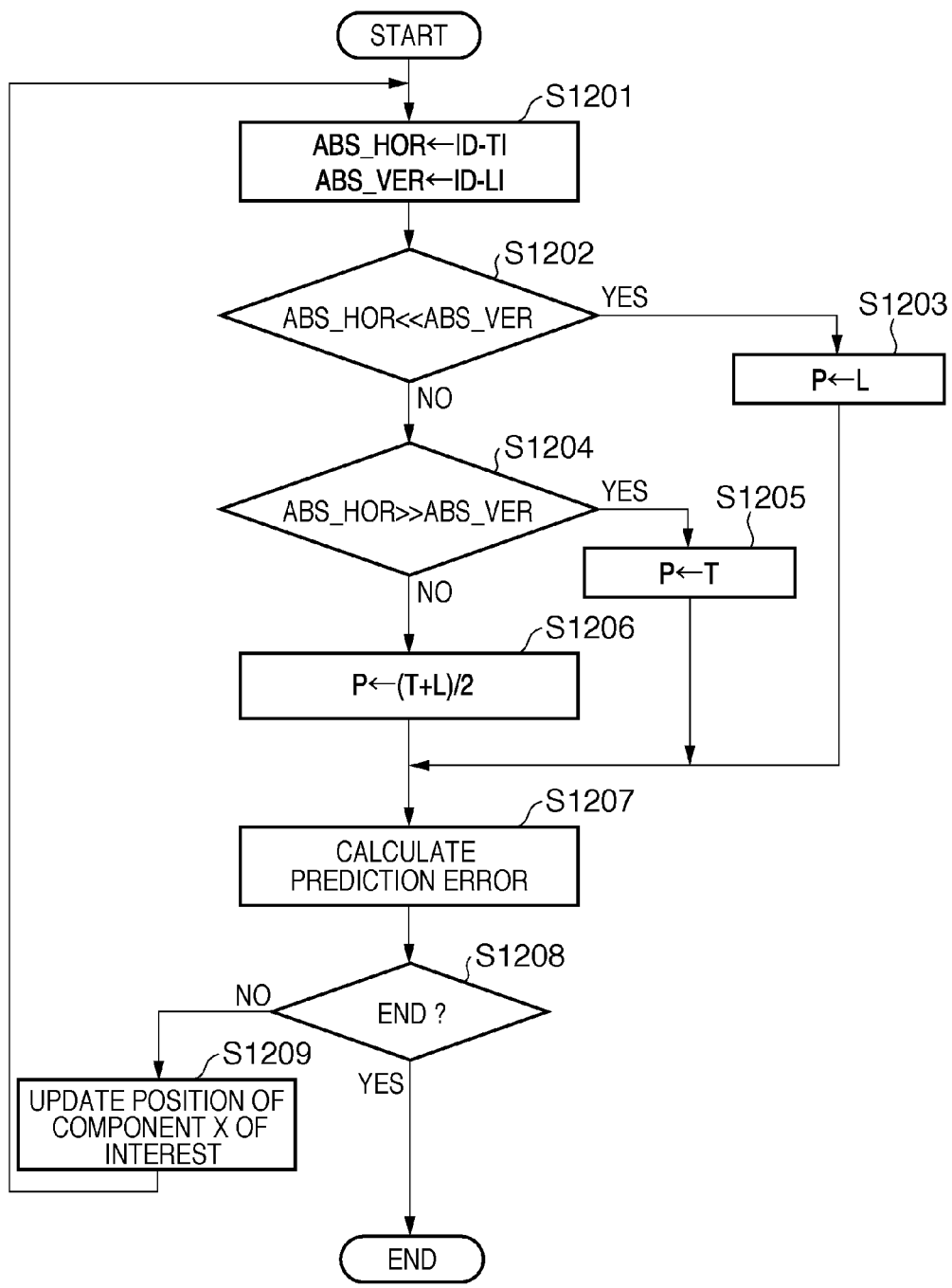
FIG. 10 is a flowchart illustrating the processing procedure of DC component prediction processing.

DC component prediction processing in a tile will be described below with reference to the flowchart of FIG. 10.

First, in step S1201, the coefficient prediction unit 104 calculates a difference absolute value (horizontal difference absolute value) ABS_HOR between the neighboring DC component values D and T, and a difference absolute value (vertical difference absolute value) ABS_VER between the neighboring DC component values D and L. In step S1202, the coefficient prediction unit 104 determines whether ABS_HOR<<ABS_VER, i.e., ABS_HOR is sufficiently smaller than ABS_VER. More specifically, the coefficient prediction unit 104 determines that ABS_HOR is sufficiently smaller than ABS_VER when $$ABS\_HOR - ABS\_VER < Th$$

where Th is a predetermined positive threshold.

Figure 11:
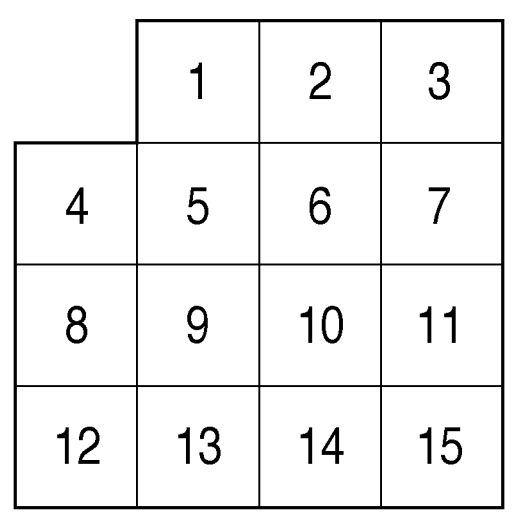

Simply put, in the process in step S1202, the coefficient prediction unit 104 determines whether similar images continue in the horizontal direction rather than in the vertical direction near the tile of interest (the position X in FIG. 11). If ABS_HOR<<ABS_VER in step S1202, the process advances to step S1203. The coefficient prediction unit 104 decides to use the left DC component L as a predicted value P of the DC component X of interest. If NO in step S1202, the process advances to step S1204. In step S1204, the coefficient prediction unit 104 determines whether ABS_HOR>>ABS_VER, i.e., ABS_VER is sufficiently smaller than ABS_HOR. As in step S1202, the coefficient prediction unit 104 determines that ABS_VER is sufficiently smaller than ABS_HOR when $$ABS\_VER - ABS\_HOR < Th$$

If ABS_VER<<ABS_HOR (YES in step S1204), the probability that the difference between the DC component X of interest and the DC component T located adjacent in the vertical direction is small is high. The process advances to step S1205. The coefficient prediction unit 104 decides to use the upper DC component T as the predicted value P of the DC component X of interest. If NO in step S1204, the process advances to step S1206. The coefficient prediction unit 104 decides to use (T+L)/2 as the predicted value P of the DC component X of interest. Note that (T+L)/2 is obtained by calculating T+L and then shifting the value to the lower side by one bit (fractions below the decimal point are dropped).

In one of steps S1203, S1205, and S1206, the predicted value P of the DC component X of interest is obtained. In step S1207, the coefficient prediction unit 104 calculates, as a prediction error, the difference between the DC component X of interest and the predicted value P. Then, the process advances to step S1208. The coefficient prediction unit 104 determines whether prediction error calculation has ended for all DC components in the tile of interest. If NO in step S1208, the position of the DC component X of interest is updated to the next position in step S1209, and the process returns to step S1201. In the above-described way, prediction error calculation processing of the 6×4 DC components in the tile of interest is performed.

(2) Low-Pass Component (ACDC Component) Prediction

FIG. 11 shows the arrangement of ACDC components after quantization of one macro block. This arrangement also indicates ACDC component values (FIG. 5) obtained by performing second frequency conversion processing for a macro block. Targets of low-pass component prediction processing are ACDC components {1, 2, 3} or ACDC components {4, 8, 12} in FIG. 11. For example, when it is decided to perform prediction processing of the ACDC components {4, 8, 12} in FIG. 11, the ACDC components {1, 2, 3, 5, 6, 7, 9, 10, 11, 13, 14, 15} at the remaining positions do not undergo prediction error calculation processing. If the macro block of interest is located on the left edge or upper edge of the tile, there is no macro block which is adjacent to the macro block of interest and should be referred to. If no macro block to be referred to exists, it is assumed that {1, 2, 3} have undergone prediction error calculation in the inexistent macro block. The prediction error calculation targets may be {4, 8, 12}. That is, the targets need only be the same on the encoding side and on the decoding side.

Figure 12:
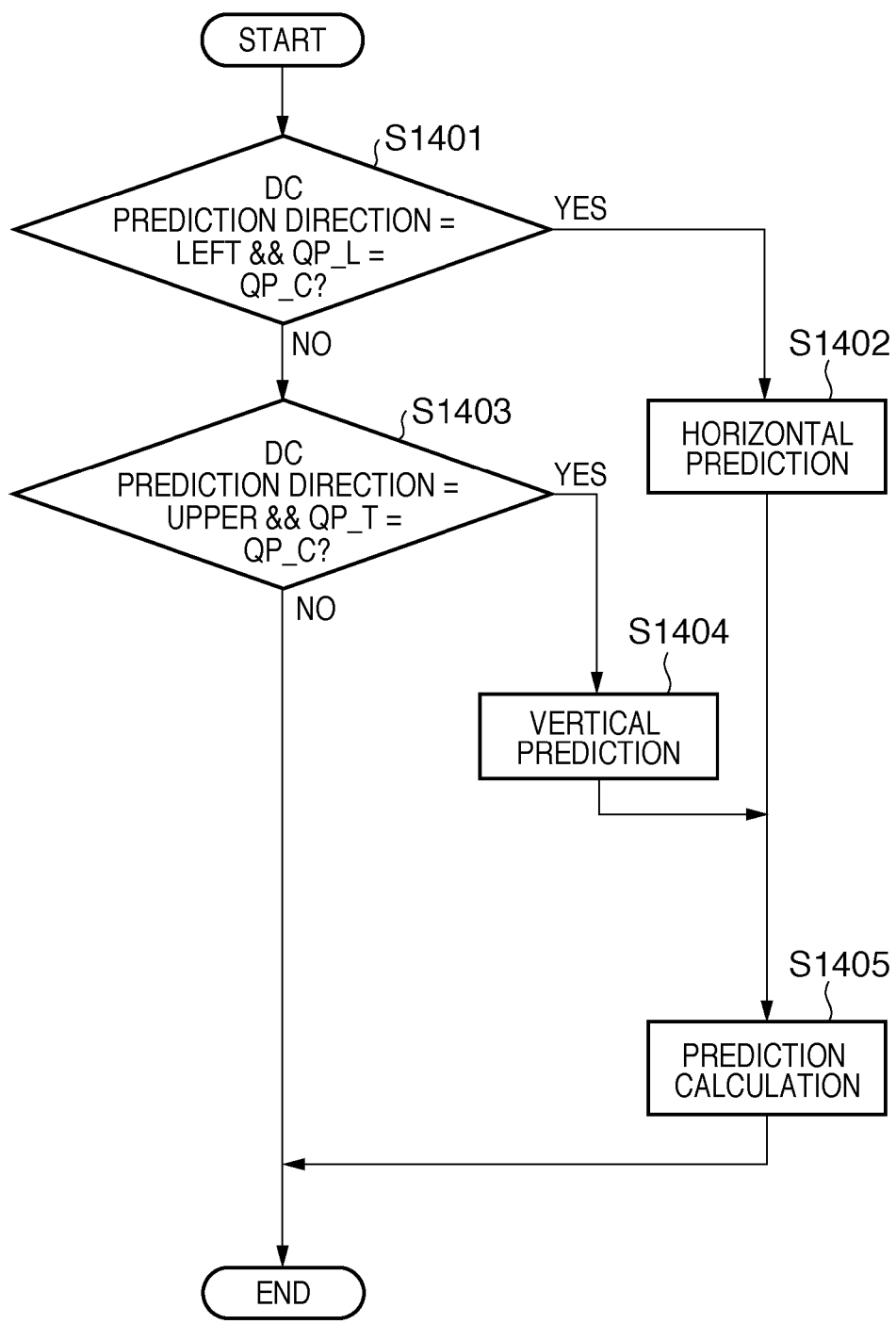
FIG. 12 is a flowchart illustrating the processing procedure of low-pass component prediction processing.

FIG. 12 is a flowchart illustrating the processing procedure of low-pass component prediction processing. The processing will be described below with reference to the flowchart. In step S1401, the coefficient prediction unit 104 determines whether the DC prediction direction of the macro block on the left side of the block of interest is horizontal, and a quantization parameter QP_C of the DC component of the macro block of interest equals a quantization parameter QP_L of the DC component of the macro block on the left side of the macro block of interest. If the two conditions are satisfied (YES in step S1401), the coefficient prediction unit 104 decides the horizontal direction as the prediction direction of the block of interest. More specifically, {1, 2, 3} in FIG. 11 are decided as prediction error calculation targets, and the remaining components are excluded from the targets (step S1402). The coefficient prediction unit 104 executes prediction error calculation in step S1405. If NO in step S1401, the coefficient prediction unit 104 advances the process to step S1403. In step S1403, the coefficient prediction unit 104 determines whether the DC prediction direction of the macro block on the upper side of the block of interest is vertical, and the quantization parameter QP_C of the DC component of the macro block of interest equals a quantization parameter QP_T of the DC component of the macro block on the upper side of the macro block of interest. If the two conditions are satisfied, the coefficient prediction unit 104 decides the vertical direction as the prediction direction of the block of interest. More specifically, {4, 8, 12} in FIG. 11 are decided as prediction error calculation targets (step S1404), and the remaining components are excluded from the targets. The coefficient prediction unit 104 executes prediction error calculation in step S1405. If NO in step S1403, the processing ends without performing prediction error calculation for the ACDC components in the macro block of interest.

(3) High-Pass Component (AC Component) Prediction

FIGS. 13A to 13C are views showing (three) prediction directions of high-pass components. High-pass components here are the AC components excluding the DC components of 4×4 blocks obtained by the first frequency conversion in FIG. 5 (FIG. 5). One DC component and 15 AC components are obtained from one block that has undergone frequency conversion. In FIG. 13D, numbers 1 to 15 are assigned to indicate the positions of the AC components in the arrangement. Targets of high-pass component prediction are AC components {1, 2, 3} or AC components {4, 8, 12} in FIG. 13A. For example, when it is decided to obtain prediction errors of the AC components {1, 2, 3}, the AC components {4, 5, 6, . . . , 15} are excluded from the prediction error calculation processing targets.

Figure 14:
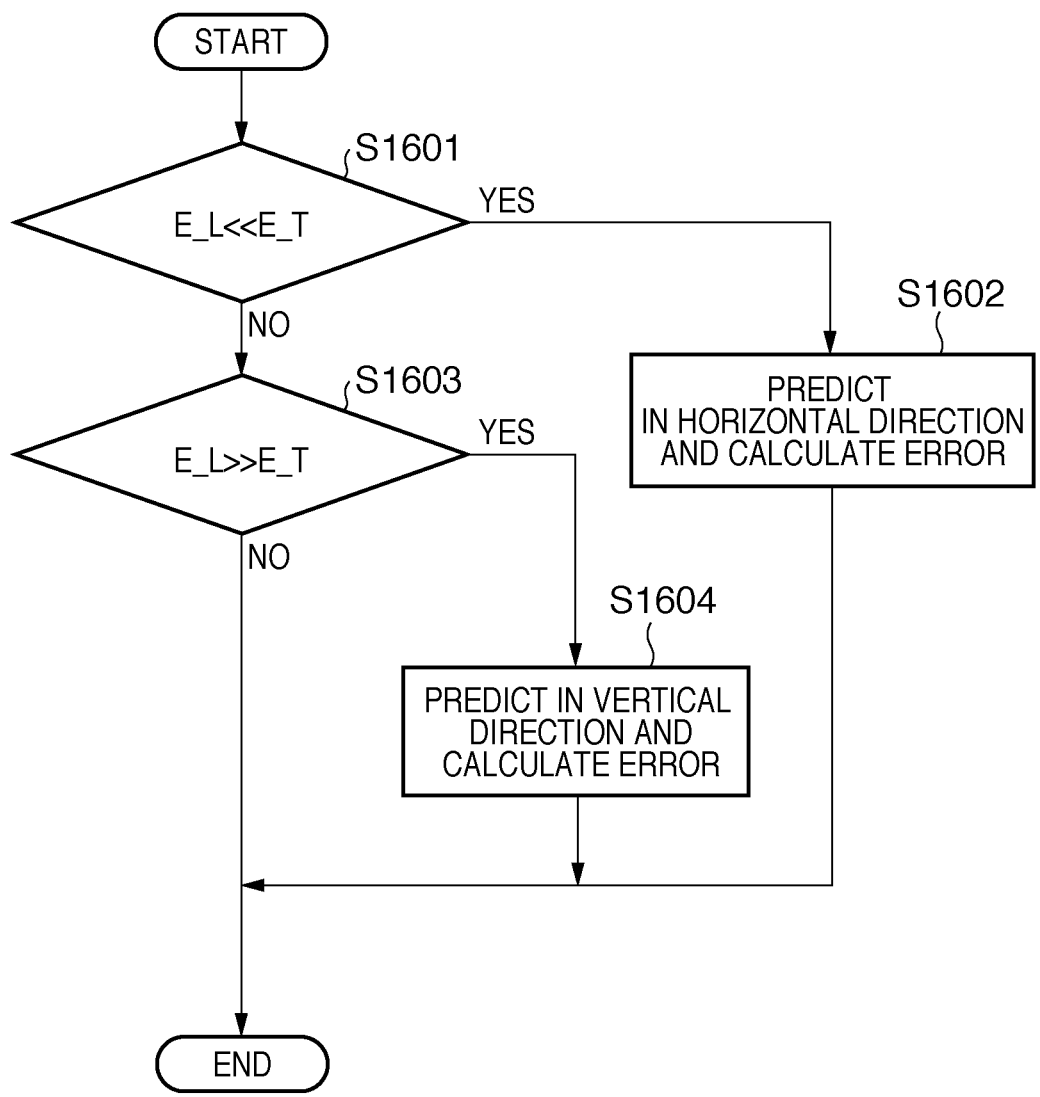
FIG. 14 is a flowchart illustrating the processing procedure of high-pass component prediction processing.

FIG. 14 is a flowchart illustrating high-pass component prediction processing. The processing will be described below with reference to FIG. 14.

An energy value E_L of the AC component values at the positions {4, 8, 12} of blocks on the left edge of the tile of interest and an energy value E_T of the AC component values at the positions {1, 2, 3} of blocks on the upper edge of the tile of interest are obtained. The tile of interest includes 4×4 blocks. The value E_L is the sum of the absolute values of the AC components at the positions {4, 8, 12} of the 16 blocks. The value E_T is the sum of the absolute values of the AC components at the positions {1, 2, 3} of the 16 blocks. In step S1601, the coefficient prediction unit 104 determines whether E_L is sufficiently smaller than E_T. The coefficient prediction unit 104 may determine whether $E\_L-E\_T<Th$ is satisfied, where Th is a preset positive threshold.

Upon determining that $E\_L \ll E\_T$, the coefficient prediction unit 104 decides the horizontal direction as the direction of obtaining the prediction errors of the AC components of the block of interest. In step S1602, the coefficient prediction unit 104 scans the AC components at the positions {4, 8, 12} of the blocks in the horizontal direction shown in FIG. 13A, thereby obtaining prediction errors.

If NO in step S1601, the process advances to step S1603 to determine whether E_T is sufficiently smaller than E_L. Using the above threshold Th, the coefficient prediction unit 104 may determine whether $E\_T-E\_L<Th$ is satisfied.

Upon determining in step S1603 that $E\_T \ll E\_L$, the coefficient prediction unit 104 decides the vertical direction as the direction of obtaining the prediction errors of the AC components of the block of interest. In step S1604, the coefficient prediction unit 104 scans the AC components at the positions {1, 2, 3} of the blocks in the horizontal direction shown in FIG. 13B, thereby obtaining prediction errors.

If NO in step S1603, the coefficient prediction unit 104 does not perform prediction error calculation for the AC components in the macro block of interest (FIG. 13C). In the embodiment, one tile includes 6×4 macro blocks. Hence, the header of finally output encoded data of each tile stores information representing "horizontal", "vertical", or "no scan" as the scanning direction of each macro block.

The processing of the coefficient prediction unit 104 has been described above. As the result of prediction processing of the coefficient prediction unit 104, the prediction errors of the DC components, ACDC components, and AC components and a plurality of component values that have not undergone prediction error calculation are output to the coefficient scanning unit 105.

The coefficient scanning unit 105 includes a buffer to store the above-described information of one tile. The coefficient scanning unit 105 zigzag-scans the components (the prediction errors and the components that have not undergone prediction error calculation), like coefficient scanning of JPEG, and rearranges them in the buffer. Since this operation is not essential to the present invention, a detailed description of the operation will be omitted.

The entropy encoding unit 106 entropy-encodes the values arranged in the internal buffer of the coefficient scanning unit 105 (assigns Huffman code words). In the embodiment, as for DC components, the difference between adjacent blocks is calculated and Huffman-coded. As for low-pass components and high-pass components, two-dimensional Huffman coding is performed for each combination of a zero-run coefficient and a non-zero coefficient in accordance with the zigzag-scanning order. The two-dimensional Huffman coding is executed using the same technique as JPEG.

When entropy encoding of one tile has finished, the code stream generating unit 107 rearranges encoded data as the result of entropy encoding, and generates a code stream with a header added to the top.

In the embodiment, there are two arrangement modes of the code stream of one tile. One is a spatial mode (spatial order code stream), and the other is a frequency mode (resolution order code stream). In the spatial mode, data of macro blocks in a tile are arranged in the raster scanning order, as shown in FIG. 15A. One macro block data contains encoded data of DC components, those of ACDC components, and those of AC components in this order. In the frequency mode, encoded data of DC components in a tile are arranged first, those of ACDC components are arranged next, and those of AC components are arranged at last, as shown in FIG. 15B. That is, encoded data are arranged from a low frequency to a high frequency.

The format in the spatial mode is convenient for reproducing an original image from the beginning. On the other hand, the latter, i.e., the frequency mode, is convenient for reproducing an image having a resolution (intermediate resolution) lower than that of an original image. That is, the frequency mode is suitable for reproducing an image while gradually raising its resolution. "FLEXBITS" in encoded data of the frequency mode shown in FIG. 15B will briefly be explained. Each of component values (including prediction error values) is divided into an upper bit group and a lower bit group at a predetermined bit position of multiple bits representing the component value. It is highly probable that the upper bit group continuously includes the same value, and it therefore undergoes encoding. The values in the lower bit group have no continuity, so no encoding is performed. FLEXBITS includes unencoded data of the lower bits of each of component values (including prediction error values).

In this embodiment, if the above-described code stream forming information CF is "2", the code stream generating unit 107 generates a code stream by arranging encoded data in an order according to the frequency mode. If the code stream forming information CF is "1", the code stream generating unit 107 generates a code stream in the spatial mode. Simply put, when encoding an image having a high resolution (in the embodiment, the size is L or more), the image has an enormous number of pixels, and it is highly probable that the user generally views (decodes) an image having a lower resolution. Hence, a code stream is generated in the frequency mode. If the size is smaller than L, a code stream is formed in the spatial mode.

In the embodiment, the frequency mode or spatial mode is decided by determining whether the size is equal to or more than L or less. The determination may be done based on whether the size is equal to or more than M or less. Especially, recent digital cameras are steadily increasing the number of effective pixels, and the number of selectable image sizes is expected to increase from three to four or more. Hence, the user may set the size (number of pixels) as the threshold. In either case, setting information representing a minimum resolution for the spatial mode is held in a nonvolatile memory, and a code stream is formed based on the held information.

Those skilled in the art can easily understand that code stream generation in the spatial mode is relatively simple processing because a code stream can be formed for each macro block. On the other hand, processing in the frequency mode takes a longer time because a code stream can be formed only after the entire tile has been encoded. However, the latter method allows display of a reduced image at the initial stage of decoding/reproduction. It is therefore possible to heighten the value of the application.

Since the frequency mode or spatial mode is uniquely decided for one image, a file header stores information representing which mode is selected. The file header also stores information about a QP, prediction method, Huffman coding table, and the above stream conversion information SC, i.e., the execution count of distortion suppression processing. A tile header stores information representing the scanning direction in AC component prediction processing.

As described above, the larger the size of a captured image is, the more the stream conversion unit 102 executes block overlap processing (twice at maximum). This prevents an image reproduced at an intermediate resolution from including noticeable block noise, and enables to reproduce a high-quality image. If the size of a captured image is L or more, a generated code stream has a data structure in the frequency mode. This makes it possible to decode images at not only the original resolution (4000×3000 pixels in the embodiment) but also intermediate resolutions (1000×750 pixels and about 250×190 pixels in this embodiment) lower than the original resolution. That is, it is possible to directly decode encoded data files into images with three different resolutions including the resolution of the original image without through processing with a heavy load such as thinning processing.

[Explanation of Storage Device]

Figure 20:
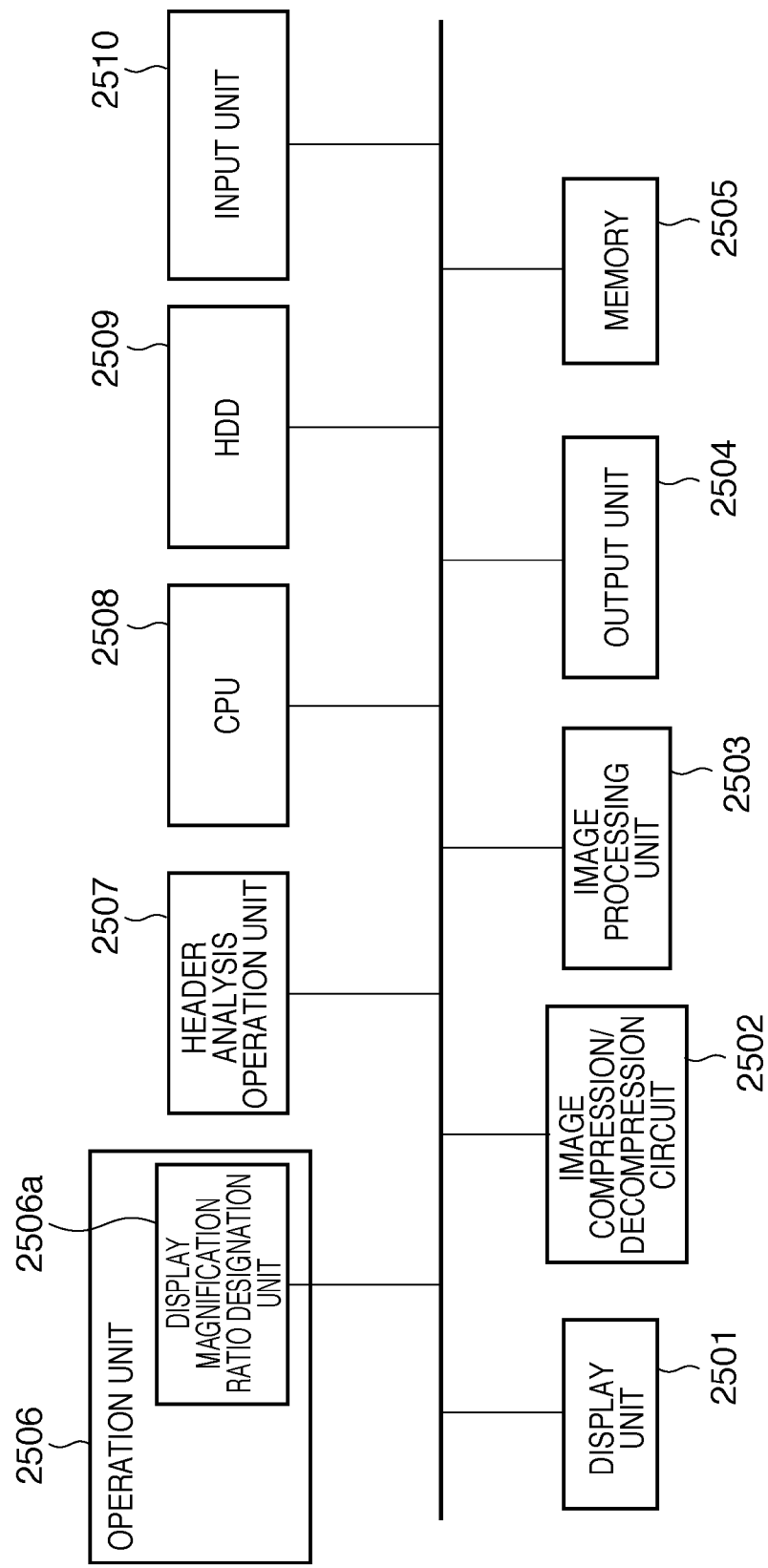
FIG. 20 is a block diagram of a storage device.

The arrangement of a storage device which stores image data captured and encoded by the above digital camera and the processing contents thereof will be described next with reference to FIG. 20. This storage device is, for example, an HDD recorder, which stores and manages image data files captured and encoded by the digital camera, and also has a function of displaying/outputting the images. The storage device includes a display unit 2501, an image compression/decompression unit 2502, an image processing unit 2503, an output unit 2504, a memory 2505, an operation unit 2506, a header analysis operation unit 2507, a CPU 2508, an HDD 2509, and an input unit 2510. In this case, the input unit 2510 is an interface which communicates with the above digital camera or a card reader in which a memory card removed from the digital camera is set. The HDD 2509 stores image data input from the input unit 2510. The operation unit 2506 includes various kinds of switches and operation buttons, one of which is a display magnification ratio designation unit

2506a. The image processing unit also performs magnifying processing in accordance with at least a set variable magnification ratio.

As shown FIG. 1B, the decompression unit of the image compression/decompression unit 2502 includes a decoding information acquisition unit 2101, an entropy decoding unit 2102, a coefficient expansion unit 2103, a coefficient inverse prediction unit 2104, an inverse quantizing unit 2105, an inverse stream conversion unit 2106, and an inverse color conversion unit 2107.

When a code stream is input to the decoding information acquisition unit 2101, the header information in the code stream is analyzed. This analysis processing acquires information associated with encoding conditions such as FLEX-BITS information, code stream order information (frequency/spatial), quantization parameter information, an overlap processing count (corresponding to the information SC in the first embodiment). The decoding information acquisition unit 2101 also receives information designating a code stream to be decoded (decoding target code stream decided in step S2503). The decoding information acquisition unit 2101 then outputs the designated code stream to the entropy decoding unit 2102 of the succeeding stage. That is, the decoding information acquisition unit 2101 outputs no information other than the designated code stream to the entropy decoding unit 2102.

The entropy decoding unit 2102 entropy-decodes the input code stream and outputs the decoding result to the coefficient expansion unit 2103. Since the coefficients have been rearranged by coefficient scanning at the time of encoding, the coefficient expansion unit 2103 performs inverse processing to restore the coefficients in the raster scanning order. The coefficient inverse prediction unit 2104 generates quantized indexes (quantized coefficients) by performing inverse calculation to the prediction calculation at the time of encoding based on the quantization step information and the like. The inverse quantizing unit 2105 generates coefficients by inversely quantizing the quantized indexes. The inverse stream conversion unit 2106 generates color-converted data by performing processing inverse to the flowchart of FIG. 3. The inverse color conversion unit 2107 generates a decoded image by performing inverse color conversion for the color-converted data.

The processing from the step of decoding the encoded image data designated by the user to the step of displaying the resultant image, which is mainly performed by the image compression/decompression circuit 2502, will be described next. As described above, skipping distortion suppression processing will cause distortion with degradation in the sense of resolution. In other words, displaying a decoded image upon reduction makes distortion less noticeable even with skipping of distortion suppression processing. Therefore, this embodiment is configured to skip (not to execute) distortion suppression processing as much as possible within the range in which image quality degradation is not noticeable, in accordance with the stream conversion information SC of the header portion of decoding target encoded image data and variable magnification ratio R (R is a real number equal to or less than 1) set by the user.

The processing procedure to be performed by the CPU 2508 when the user issues an image decode instruction (reproduction instruction) via the operation unit 2506 will be described with reference to the flowchart of FIG. 21.

When the user issues an image decode instruction, the CPU 2508 copies encoded image data to be decoded from the HDD 2509 onto the memory 2505 (step S2601). The CPU 2508 determines whether the display magnification ratio designation unit 2506a has designated a display magnification ratio (variable magnification ratio R) (step S2602). If the display magnification ratio designation unit 2506a has designated no display magnification ratio, the CPU 2508 sets the variable magnification ratio R to default magnification ratio "1" (step S2603). Note that the user may roughly set a default variable magnification ratio in advance. If the user has designated the variable magnification ratio R, the designated magnification ratio is set as the variable magnification ratio R. The CPU 2508 then analyzes the header of the copied encoded image data to acquire information necessary for decoding processing, e.g., the stream conversion information SC (step S2604). The CPU 2508 entropy-decodes the encoded image data to obtain data immediately before 2nd level inverse PCT processing, i.e., data immediately after 2nd level PCT processing on the encoding side (FIG. 22A) (step S2605). In step S2606, the CPU 2508 generates basic display image data based on the stream conversion information SC obtained by header analysis and the set variable magnification ratio R (this processing will be described in detail later). The CPU 2508 then re-sizes the generated basic display image data in accordance with the set variable magnification ratio (step S2607). The CPU 2508 displays the re-sized image data on the display unit 2501 (step S2608).

Step S2606 will be described in detail below with reference to FIGS. 23A and 23B and FIGS. 24A to 24C. Note that the user can set thresholds Th1 to Th4 to be described below by operating the operation unit, as needed. Note that Th1>Th2>Th3>Th4, the threshold Th1 is less than 1, the threshold Th2 is larger than ¼, the threshold Th3 is smaller than ¼, and the threshold Th4 is larger than ¹⁄₁₆. FIG. 23A shows this relationship. FIGS. 24A to 24C show the correspondence relationships between variable magnification ratios R and processing contents based on the thresholds for the respective values of the stream conversion information SC. For example, FIG. 24A is a table showing execution/non-execution of each process corresponding to a variable magnification ratio when stream conversion information SC=2. FIGS. 24B and 24C are tables when stream conversion information SC=1 and 0. In this case, the processing sequence in generating a decoded image is from left to right in FIGS. 24A to 24C, i.e., 2nd level inverse PCT→2nd level inverse POT→1st level inverse PCT→1st level inverse POT→level correction. Referring to FIGS. 24A to 24C, the symbol "○" indicates that the corresponding process is to be executed (not omitted), and the symbol "x" indicates that the corresponding process is not to be executed (omitted=skipped). Note that "level correction" processing is performed for the following reason. When inverse POT processing (overlap processing) is performed, the dynamic range changes. For this reason, if the image is displayed upon skipping the inverse processing, an image with an unnatural dynamic range is displayed. In the present invention, assuming that overlap processing changes the dynamic range α times, level correction is the processing of multiplying each coefficient by 1/α. Providing this level correction processing makes it possible to reduce the frequency of displaying unnatural images, even if inverse POT processing is omitted.

As described above, the encoding apparatus can execute distortion suppression processing (POT processing=block overlap processing) 0 to 2 times. A case in which the apparatus has executed distortion suppression processing 2 times (stream conversion information SC=2) will be described below with reference to FIG. 24A. Since a case in which SC=1 or 0 can be easily understood from FIGS. 24B and 24C and the following description, a description of the case will be omitted.

Consider a case in which the variable magnification ratio R designated by the user is 1/16 in both the horizontal and vertical directions relative to the original resolution. As shown in FIG. 5, a macro block in this embodiment has a size of 16×16 pixels, and hence one DC component in one overall macro block may be displayed as one pixel of a magnified image. In this case, it is not necessary to perform two inverse PCT processes (inverse frequency conversion processes) and two inverse POT processes (inverse distortion suppression processes) shown in FIG. 22B regardless of whether distortion suppression processing is executed 0, 1, or 2 times (regardless of the value of the stream conversion information SC). That is, a DC component of a macro block obtained upon entropy decoding may be handled as one pixel value.

As described above, when the variable magnification ratio R designated by the user is equal to or less than the threshold Th4 near 1/16, only DC components are required for a display image, and there is no need to perform two inverse PCT processes and two inverse POT processes. For this reason, the size of the image immediately after decoding is expressed as a "DC resolution" in FIG. 24A.

Figure 21:
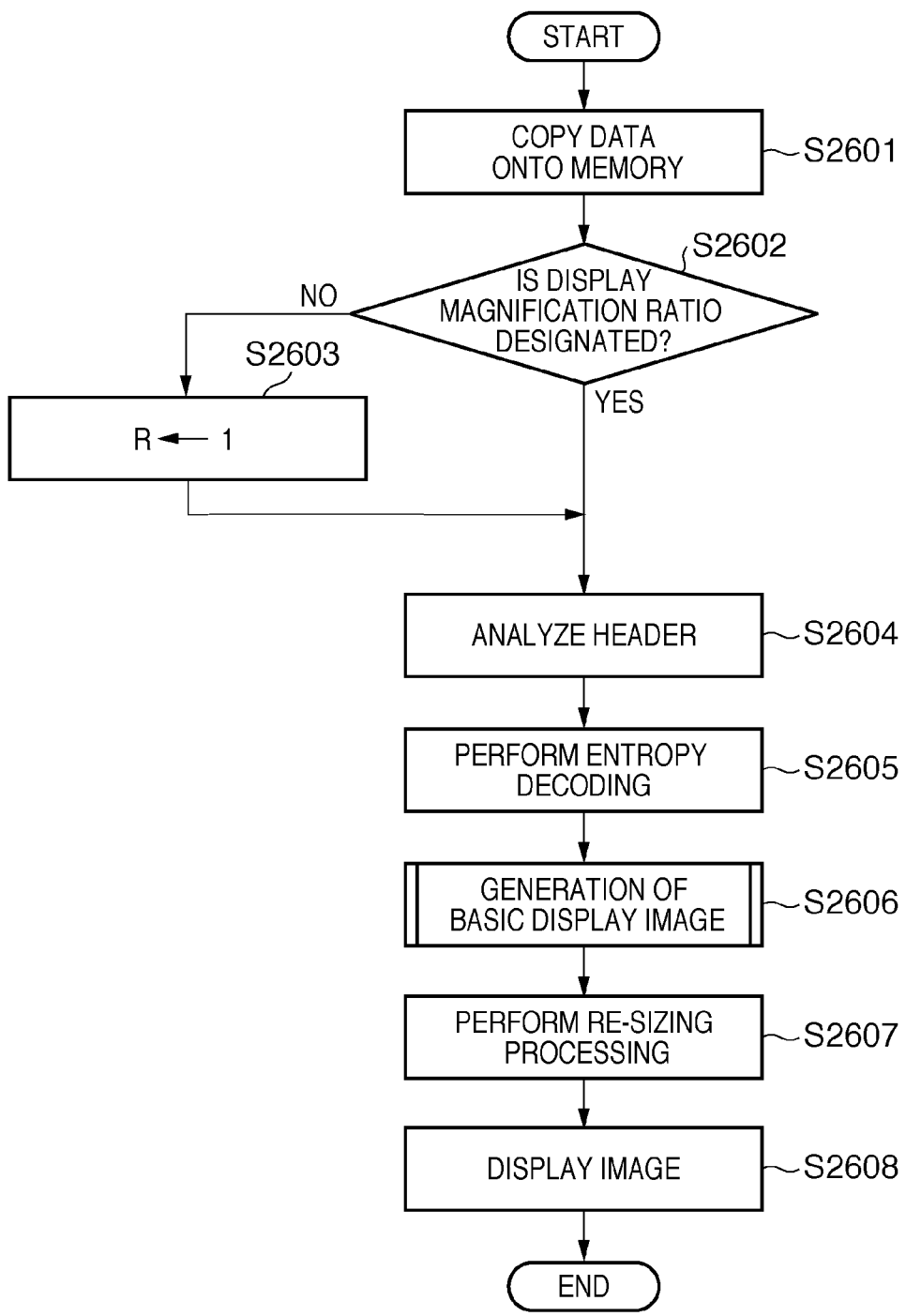
FIG. 21 is a flowchart for the storage device.

Note that the CPU 2508 supplies the obtained image data with the DC resolution and a variable magnification ratio Rr to the image processing unit 2503 to make it execute magnifying processing, and displays the magnified image (step S2607 in FIG. 21). The variable magnification ratio Rr to be set in the image processing unit 2503 is given by $$Rx = 16 \times R$$

If the variable magnification ratio R designated by the user is 1/4, it is possible to generate an image having a resolution 1/4 the original resolution by using only DC+ACDC. It is therefore possible to omit at least 1st level inverse PCT processing and 1st level inverse POT processing in FIG. 22B. If stream conversion information SC=1, it is possible to eliminate 2nd level inverse POT as well. If stream conversion information SC=2, it is preferable to decide whether to perform 2nd level inverse POT, in accordance with a variable magnification ratio. Assume that a display image is to be generated by using only DCV+ACDC components. In this case, if the variable magnification ratio R is small, it is possible to omit 2nd level inverse POT. If the variable magnification ratio R is large to a certain extent, it is preferable to perform 2nd level inverse POT. If, therefore, the variable magnification ratio R set by the user is near 1/4 (Th2≧R>Th3 in FIG. 24A), the CPU 2508 restores the image having the "LP resolution" represented by DC+ACDC components, and then supplies the image data having the LP resolution and the variable magnification ratio Rr to the image processing unit 2503 to make it execute magnifying processing. In this case, the variable magnification ratio Rr to be set by the image processing unit 2503 is given by $$Rr = 4 \times R.$$

If the variable magnification ratio R set by the user is larger than the threshold Th2, the resolution of the image to be displayed is near the original resolution. For this reason, the CPU 2508 decodes the image into an image with the same size as that of the original image, and then performs magnifying processing. The resultant image corresponds to the expression "full resolution" in the FIG. 24A. If, however, the variable magnification ratio R is larger than the threshold Th1 and a size nearer the original resolution is designated, skipping distortion suppression processing (1st level inverse POT processing) will make the distortion noticeable. The CPU 2508 therefore executes 1st level inverse POT as shown in FIG. 24A. If the variable magnification ratio R is equal to or less than the threshold Th1 and larger than the threshold Th2, skipping 1st level inverse POT will not make the distortion much noticeable. However, a closer look at the image will reveal some unnaturalness. For this reason, the CPU 2508 performs level correction even though 1st level inverse POT is omitted as shown in FIG. 24A. Note that the variable magnification ratio Rr set in the image processing unit 2503 is equal to the set variable magnification ratio R.

As described above, this embodiment sets several processes to "non-execution" within the range in which image quality degradation is not noticeable, based on the stream conversion information SC and variable magnification ratio R of decoding target encoded image data. This makes it possible to speed up decoding processing while providing the user with an image having sufficient image quality.

[Second Embodiment]

The first embodiment has exemplified the method in the processing of performing frequency conversion (PCT processing) 0, 1, or 2 times at the time of encoding and decoding. The second embodiment will exemplify a case in which frequency conversion is performed once at the time of encoding and decoding, and block overlap processing (POT processing) is performed 0 or 1 times.

The apparatus arrangement of the second embodiment is the same as that of the first embodiment except for the above point. For this reason, the difference between the embodiments will be described below. A storage device in the second embodiment determines a variable magnification ratio R by using only one threshold Th1 (Th1=1/2 in FIG. 23B) when image data is decoded and displayed, as shown in FIG. 23B.

At the time of decoding, if the variable magnification ratio R designated by the user is larger than the threshold Th1, setting distortion suppression processing to "non-execution" will make distortion noticeable. For this reason, the CPU 2508 executes the corresponding distortion suppression processing (block overlap processing). If, however, no distortion suppression processing has been performed at the time of encoding, the CPU 2508 performs no corresponding inverse processing. The CPU 2508 then re-sizes the obtained image in accordance with the magnification ratio R and displays the resultant image.

If the variable magnification ratio R is equal to or less than the threshold, the CPU 2508 sets distortion suppression processing to "non-execution". That is, the CPU 2508 regards the data having undergone PCT processing as image data, re-sizes the image in accordance with the variable magnification ratio R, and displays the resultant image. However, the CPU 2508 may execute level correction processing immediately before re-sizing processing as in the first embodiment.

Although the second embodiment cannot perform fine adjustment as in the first embodiment, the second embodiment can display a decoded image at high speed when the set variable magnification ratio R is equal to or less than the threshold Th1 even if PCT processing is performed 1 times and POT processing is executed 0 or 1 times.

[Third Embodiment]

The second embodiment has exemplified the method providing one threshold Th1. However, it is possible to provide another threshold Th2 to perform a processing procedure for enlarging DC components. In the second embodiment, it is possible to fix r=1/2 in accordance with changes in resolution by 1/2 at a time as in JPEG2000 and the like. In this case, when decoding an image with 1/2 resolution, it is possible to perform level correction processing instead of inverse processing. The second embodiment has exemplified the case in which block overlap processing is always performed at the time of encoding. However, it is possible to provide this function as an optional function. Although the embodiment has exemplified the method of suppressing block-like distortion by performing block overlap processing, it is possible to use methods using various types of filters which are not applied across blocks. Although the method of correcting a dynamic range has been described, the present invention incorporates a method which does not perform such correction. For example, if a viewer is compatible with a high dynamic range, no correction is performed. In addition, for block overlap processing without any change in dynamic range or filter processing, no correction is required in the first place.

The embodiments of the present invention have been described above. Note however that the numerical values described in the embodiments are merely examples, and the scope of the present invention is not limited to them. The embodiment has exemplified the application of the image decoding apparatus to the storage device. However, the decoding unit inside the digital camera may include the storage device. That is, the present invention is not limited by the type of device in which the storage device is mounted. It is possible to make the storage device according to each embodiment implement the same processing as that described above by using a computer program. Computer programs are normally stored in a computer-readable storage medium such as a CD-ROM. The computer programs become executable when they are copied or installed in a system by setting the storage medium in the read unit (e.g., CD-ROM drive) of a computer. Hence, the computer-readable storage medium is also incorporated in the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-143668, filed Jun. 16, 2009 which is hereby incorporated by reference herein in its entirety.

What is claimed is:

1. An image decoding apparatus which reproduces and outputs an image from encoded image data encoded by an encoding method configured to designate whether to perform distortion suppression processing of suppressing block distortion before each of two times of frequency conversion, the apparatus comprising:
 a setting unit which sets a variable magnification ratio;
 an analysis unit which analyzes a header of decoding target encoded image data and extracts encoding parameter information including at least an execution count of the distortion suppression processing;
 a decoding unit which decodes the encoded image data up to data immediately before second frequency conversion at the time of encoding;
 a determining unit which determines, based on the variable magnification ratio set by said setting unit and the encoding parameter information obtained by said analysis unit, which one of two inverse frequency conversion processes corresponding to the two times of frequency conversion executed when the encoded image data is generated and 0 to 2 times of inverse distortion suppression processing corresponding to the distortion suppression processing executed 0 to 2 times when the encoded image data is generated is configured to be omitted;
 a restoration unit which restores an image on which an output is based, by executing processing configured not to be omitted, based on a determination result obtained by said determining unit; and
 a re-sizing unit which re-sizes the image restored by said restoration unit in accordance with the variable magnification ratio set by said setting unit and outputs the image.

2. The apparatus according to claim 1, wherein when defining a variable magnification ratio set by said setting unit as R, a resolution of an image decoded by using all encoded image data as a full resolution, a resolution of an image represented by DC components obtained by first frequency conversion at the time of encoding as an LP resolution, and a resolution of an image represented by DC components obtained by second frequency conversion at the time of encoding as a DC resolution, said determining unit decides an execution count of inverse frequency conversion and decides an execution count of the inverse distortion suppression processing, in accordance with which one of the DC resolution, the LP resolution, and the full resolution a resolution of an image with the variable magnification ratio R set by said setting unit is near.

3. The apparatus according to claim 2, wherein said determining unit determines that the inverse frequency conversion is not omitted, when the variable magnification ratio R set by said setting unit is larger than a preset threshold, and a resolution of an image with the variable magnification ratio R is near the full resolution.

4. An image decoding apparatus which reproduces and outputs an image from encoded image data encoded by an encoding method of performing distortion suppression processing of suppressing block distortion before first frequency conversion, the apparatus comprising:
 a setting unit which sets a variable magnification ratio;
 an analysis unit which analyzes a header of decoding target encoded image data and extracts encoding parameter information including at least an execution count of the distortion suppression processing;
 a decoding unit which decodes the target encoded image data up to data immediately before the frequency conversion;
 an inverse distortion suppression processing unit which executes the inverse distortion suppression processing for data obtained by said decoding unit, when the variable magnification ratio set by said setting unit is larger than a preset threshold; and
 a re-sizing unit which qualifies data obtained by said decoding unit as image data on which an output is based and re-sizes the qualified image data in accordance with the variable magnification ratio set by said setting unit, when the variable magnification ratio set by said setting unit is not more than a preset threshold, and re-sizes the image data obtained by said inverse distortion suppression processing unit in accordance with the variable magnification ratio set by said setting unit, when the variable magnification ratio set by said setting unit is larger than the threshold, and outputs the image data.

5. A control method for an image decoding apparatus which reproduces and outputs an image from encoded image data encoded by an encoding method configured to designate whether to perform distortion suppression processing of suppressing block distortion before each of two times of frequency conversion, the method comprising steps of:

causing a setting unit to set a variable magnification ratio;

causing an analysis unit to analyze a header of decoding target encoded image data and extract encoding parameter information including at least an execution count of the distortion suppression processing;

causing a decoding unit to decode the encoded image data up to data immediately before second frequency conversion at the time of encoding;

causing a determining unit to determine, based on the variable magnification ratio set in the setting step and the encoding parameter information obtained in the analyzing step, which one of two inverse frequency conversion processes corresponding to the two times of frequency conversion executed when the encoded image data is generated and 0 to 2 times of inverse distortion suppression processing corresponding to the distortion suppression processing executed 0 to 2 times when the encoded image data is generated is configured to be omitted;

causing a restoration unit to restore an image on which an output is based, by executing processing configured not to be omitted, based on a determination result obtained in the determining step; and causing a re-sizing unit to re-size the image restored in the restoring step in accordance with the variable magnification ratio set in the setting step and output the image.

6. The method according to claim 5, wherein when defining a variable magnification ratio set in the setting step as R, a resolution of an image decoded by using all encoded image data as a full resolution, a resolution of an image represented by DC components obtained by first frequency conversion at the time of encoding as an LP resolution, and a resolution of an image represented by DC components obtained by second frequency conversion at the time of encoding as a DC resolution, in the determining step, an execution count of inverse frequency conversion is decided and it is decided whether to execute inverse distortion suppression processing, in accordance with which one of the DC resolution, the LP resolution, and the full resolution a resolution of an image with the variable magnification ratio R set in the setting step is near.

7. The method according to claim 6, wherein in the determining step, it is determined that the inverse frequency conversion is not omitted, when the variable magnification ratio R set in the setting step is larger than a preset threshold, and a resolution of an image with the variable magnification ratio R is near the full resolution.

8. A control method for an image decoding apparatus which reproduces and outputs an image from encoded image data encoded by an encoding method of performing distortion suppression processing of suppressing block distortion before first frequency conversion, the method comprising steps of:

causing a setting unit to set a variable magnification ratio;

causing an analysis unit to analyze a header of decoding target encoded image data and extract encoding parameter information including at least an execution count of the distortion suppression processing;

causing a decoding unit to decode the target encoded image data up to data immediately before the frequency conversion;

causing an inverse distortion suppression processing unit to execute the inverse distortion suppression processing for data obtained in the decoding step, when the variable magnification ratio set in the setting step is larger than a preset threshold; and causing a re-sizing unit to qualify data obtained in decoding step as image data on which an output is based and to re-size the qualified image data in accordance with the variable magnification ratio set in the setting step, when the variable magnification ratio set in the setting step is not more than a preset threshold, and re-size the image data obtained in the inverse distortion suppression processing step in accordance with the variable magnification ratio set in the setting step, when the variable magnification ratio set in the setting step is larger than the threshold, and output the image data.

9. A non-transitory computer-readable storage medium storing a computer program which, when executed by a computer, causes the computer to perform the control method according to claim 5.

* * * * *